(12) United States Patent
King

(10) Patent No.: US 11,614,789 B2
(45) Date of Patent: Mar. 28, 2023

(54) POWER MANAGEMENT BY CLOCK DITHERING

(71) Applicant: Graphcore Limited, Bristol (GB)

(72) Inventor: Ian Malcolm King, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/350,172

(22) Filed: Jun. 17, 2021

(65) Prior Publication Data

US 2022/0019276 A1    Jan. 20, 2022

(30) Foreign Application Priority Data

Jul. 17, 2020   (GB) ..................................... 2011089

(51) Int. Cl.
| | |
|---|---|
| *G06F 1/324* | (2019.01) |
| *G06F 1/08* | (2006.01) |
| *G06F 1/06* | (2006.01) |
| *G06F 1/04* | (2006.01) |

(52) U.S. Cl.
CPC .............. *G06F 1/324* (2013.01); *G06F 1/06* (2013.01); *G06F 1/08* (2013.01); *G06F 1/04* (2013.01)

(58) Field of Classification Search
CPC ... G06F 1/324; G06F 1/08; G06F 1/04; G06F 1/06
USPC ........................................ 713/322, 501, 600
See application file for complete search history.

(56) References Cited

U.S. PATENT DOCUMENTS

| | | | | |
|---|---|---|---|---|
| 6,914,463 | B2* | 7/2005 | Henry | ............... H03K 23/667 327/175 |
| 7,106,110 | B2* | 9/2006 | Canada | ................... G06F 1/08 327/175 |
| 7,249,274 | B1 | 7/2007 | McGinnis | |
| 8,769,332 | B2* | 7/2014 | Ziesler | ................... G06F 1/10 713/322 |
| 2002/0108070 | A1* | 8/2002 | Oh | ...................... G06F 1/3253 713/600 |
| 2004/0133816 | A1* | 7/2004 | Miyairi | ................ G06F 1/324 713/300 |
| 2013/0145190 | A1 | 6/2013 | Sakugawa | |
| 2013/0305078 | A1 | 11/2013 | Lee | |
| 2014/0049327 | A1* | 2/2014 | Bruset | .................. H03L 7/24 331/44 |

(Continued)

FOREIGN PATENT DOCUMENTS

| | | |
|---|---|---|
| KR | 20030089120 A | 11/2003 |
| WO | 2010057686 A1 | 5/2010 |
| WO | 2014017472 A1 | 7/2016 |

OTHER PUBLICATIONS

Search Report dated Dec. 18, 2020 for United Kingdom Patent Application No. GB2011089.6. 4 pages.

(Continued)

*Primary Examiner* — Ji H Bae
(74) *Attorney, Agent, or Firm* — Haynes and Boone, LLP

(57) ABSTRACT

A system and method for docking a processing unit provided. According to the method, the system dithers between the two signals provided by the two clock generators so as to clock the processing unit at an average clock frequency having a value between the frequencies of the two signals. The average clock frequency is adjusted by modifying the proportion of time spent on one clock signal vs the other clock signal.

21 Claims, 20 Drawing Sheets

(56) References Cited

U.S. PATENT DOCUMENTS

2014/0093009 A1 4/2014 Song
2016/0041578 A1 2/2016 Samsung

OTHER PUBLICATIONS

Search Report dated Dec. 8, 2020 for United Kingdom Patent Application No. GB2011085.4. 4 pages.
Search Report dated Apr. 7, 2021 for International Application No. PCT/EP2020/087564. 13 pages.

* cited by examiner

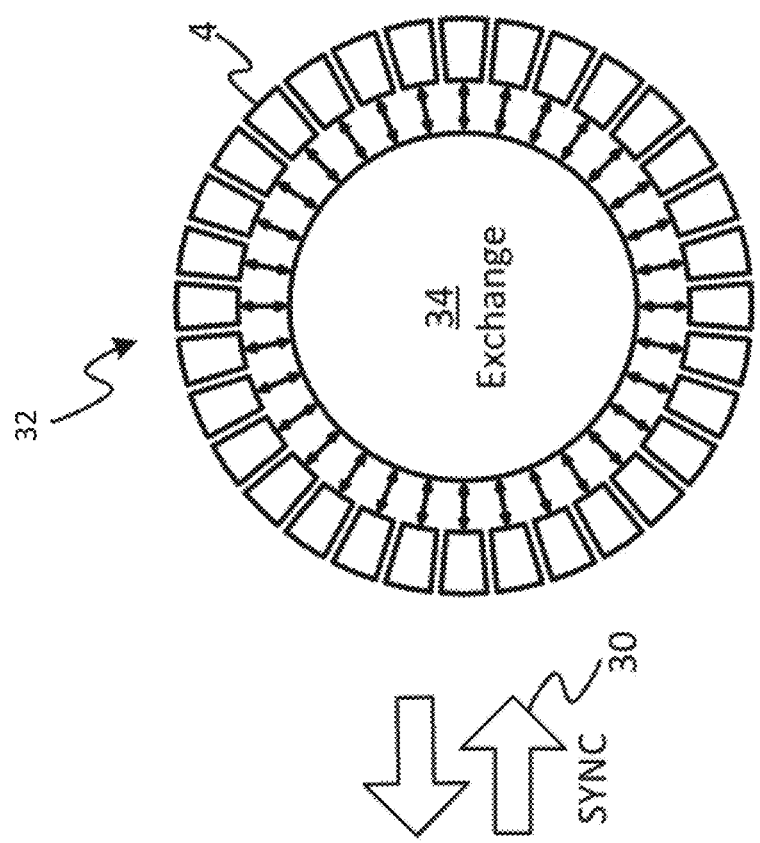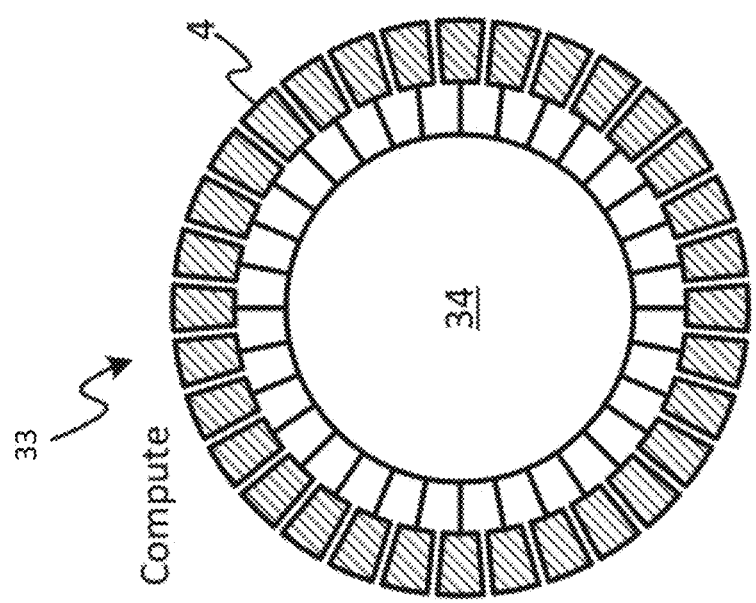
Fig. 15

POWER MANAGEMENT BY CLOCK DITHERING

CROSS-REFERENCE TO RELATED APPLICATIONS

The present application claims priority to United Kingdom Patent Application No. 2011089.6, filed on Jul. 17, 2020, the disclosure of which is hereby incorporated herein by reference in its entirety.

TECHNICAL FIELD

The present disclosure relates to controlling a frequency of a clock signal for a processing unit.

BACKGROUND

When executing an application on a processing unit there are many different variables which affect the performance of the processing unit when executing that application. These variables include the voltage at which the processing unit is running, the current drawn by the processing unit, the temperature of the processing unit, and the clock frequency, which is controlled by a processing unit clock signal. There are many contexts in which these factors become interdependent. This makes selecting an optimum frequency for a processing unit clock signal very challenging.

There are two potentially opposing considerations when selecting a processing unit clock frequency. On the one hand, there is a general desire not to "waste power". The faster a clock runs, the more power will be consumed by the application running on the processing unit. On the other hand, processing units are increasingly being built with a capacity to run "hot", that is, with high-power budgets. The faster the processing unit clock runs, the more efficiently a particular application can be executed and deliver its output. This is particularly the case for processing units which act as accelerators for processing the demanding workloads in artificial intelligence/machine learning applications.

One factor that increases the challenge when attempting to select an optimum clock frequency is that any given application running on a processing unit may vary in its power requirements over its execution. For instance, when entering computationally intensive phases of an application, there is an increase in the number of switching elements in the processing unit that are switched every clock cycle. Such an increase in the amount of switching in the processing unit leads to an increase in the amount of power that must be drawn by the processing unit to prevent failures in the processing unit's operations.

As the processing unit's power requirements vary over execution of an application, during some periods there is a danger that the power drawn by the processing unit may exceed a power budget for the processing unit. In these circumstances, it is desirable to lower the clock frequency as to prevent the power budget from being exceeded. On the other hand, when the processing unit executes less computationally intensive code with lower power usage, the clock frequency can be increased so as to enable the application to execute more rapidly.

One method of managing the clock signal supplied to the chip is to adjust a phase locked loop that supplies the clock signal. When adjusting the clock frequency in this way, there is a certain lock time associated with the PLL that supplies the clock signal. The "lock" time is the time taken by the PLL to change from one stable output frequency to a different stable output frequency in response to the adaption signal that is being applied.

SUMMARY

There is a want for a new method for adjusting the frequency at which a processing unit is clocked.

According to a first aspect, there is provided a method of controlling a frequency of a clock signal for a processing unit, the method comprising: cycling between the selection of: a first clock generator for providing a processing unit clock signal for executing an application during a first part of the cycle; and a second clock generator for providing the processing unit clock signal for executing the application during a second part of the cycle, wherein a frequency of the clock signal provided by the second clock generator is less than a frequency of the clock signal provided by the first clock generator, increasing an average clock frequency for the processing unit by increasing a ratio between a duration of the first part of the cycle and a duration of the second part of the cycle; and decreasing an average dock frequency for the processing unit by decreasing the ratio between the duration of the first part of the cycle and the duration of the second part of the cycle.

Therefore, the system switches (i.e. dithers) between the two signals provided by the two clock generators so as to clock the processor at an average clock frequency having a value between the frequencies of the two signals. The average clock frequency is adjusted by modifying the proportion of time spent on one clock signal vs the other clock signal. The system may set the average clock frequency to the appropriate level so as to allow the processor to achieve a good tradeoff between performance and power consumption.

In some embodiments, the method comprises determining whether power consumption of the processing unit exceeds a set power budget, wherein the cycling comprises: selecting the second clock generator for providing the processing clock signal in response to a determination that the set power budget is exceeded; and selecting the first clock generator for providing the processing clock signal in response to a determination that the set power budget is not exceeded.

In some embodiments, the step of determining whether power consumption of the processing unit exceeds a set power budget comprises comparing a current threshold to a measurement of current drawn by the processing unit using a comparator, wherein an output signal of the comparator is used to control the selection of the first clock generator and the selection of the second clock generator.

In some embodiments, comprising filtering a current measurement to produce a filtered version of the current measurement, wherein the step of comparing the current threshold to the measurement of current drawn by the processing unit comprises comparing a filtered version of the current measurement to a current threshold.

In some embodiments, the comparator has an associated delay, allowing the power consumption to exceed the power budget for a duration of time without triggering selection of the second dock generator.

In some embodiments, the method comprises: storing a plurality of settings, wherein each setting comprises a frequency for the first dock generator and a frequency for the second clock generator; and changing from a first of the settings to a second of the settings by adjusting the frequencies set for the first dock generator and the second dock generator from frequencies defined by the first of the settings to frequencies defined by the second of the settings.

In some embodiments, the frequencies defined by the second of the settings are higher than the frequencies defined by the first of the settings, wherein the method comprises: performing the step of changing from the first of the settings to the second of the settings in response to a determination that the first clock generator has been selected for providing the processing unit clock signal for greater than a predefined amount of time.

In some embodiments, the method comprises making the determination that the first clock generator has been selected for greater than a predefined amount of time in response to determining that the output signal of the comparator has selected the first clock generator for greater than a predefined amount of time.

In some embodiments, the frequencies defined by the first of the settings are higher than the frequencies defined by the second of the settings, wherein the method comprises: performing the step of changing from the first of the settings to the second of the settings in response to a determination that the second clock generator has been selected for providing the processing unit clock signal for greater than a predefined amount of time.

In some embodiments, the method comprises making the determination that the second clock generator has been selected for greater than a predefined amount of time in response to determining that the output signal of the comparator has selected the second clock generator for greater than a predefined amount of time.

In some embodiments, the method comprises in response to detection of an overcurrent event, changing to a third setting by adjusting the frequencies set for the first dock generator and the second dock generator to frequencies defined by the third setting, wherein the third setting has lower values for the frequencies of the first and second dock generator than any of the other settings.

In some embodiments, the comparator for determining whether power consumption of the processing unit exceeds a set power budget is a first comparator, wherein the detection of the overcurrent event is performed by a second comparator, wherein the first and the second comparator are different, wherein the second comparator has a higher current threshold than the first comparator.

In some embodiments, the processing unit comprises multiple processors, the method comprising distributing the processor dock signal along wires of a dock tree of the processing unit to each of multiple processors.

In some embodiments, the wires are copper wires having a thickness greater than 0.2 micrometres.

According to a second aspect, there is provided a system comprising: a first dock generator for providing a processing unit clock signal for executing an application during a first part of the cycle; a second dock generator for providing the processing unit dock signal for executing the application during a second part of the cycle, wherein a frequency of the clock signal provided by the second clock generator is less than a frequency of the clock signal provided by the first clock generator; and switching circuitry configured to: cycle between the selection of the first clock generator for clocking the processing unit during a first part of the cycle and the second clock generator for clocking the processing unit during a second part of the cycle; and increase an average clock frequency for the processing unit by increasing a ratio between a duration of the first part of the cycle and a duration of the second part of the cycle; and decreasing an average clock frequency for the processing unit by decreasing the ratio between the duration of the first part of the cycle and the duration of the second part of the cycle.

In some embodiments, the system comprises circuitry configured to determine whether power consumption of the processing unit exceeds a set power budget, wherein the cycling comprises: selecting the second dock generator for providing the processing clock signal in response to a determination that the set power budget is exceeded; and selecting the first clock generator for providing the processing clock signal in response to a determination that the set power budget is not exceeded.

In some embodiments, the circuitry configured to determine whether power consumption of the processing unit exceeds the set power budget comprises a comparator, wherein the comparator is configured to determine whether power consumption of the processing unit exceeds the set power budget by comparing a current threshold to a measurement of current drawn by the processing unit, wherein the switching circuitry is configured to perform the cycling between the first clock generator and the second clock generator by switching between the selection of the first clock generator and the selection of the second clock generator in response to an output signal of the comparator.

In some embodiments, comprising a filtering circuit configured to filter a current measurement to produce a filtered version of the current measurement, wherein the step of comparing the current threshold to the measurement of current drawn by the processing unit comprises comparing the filtered version of the current measurement to the current threshold.

In some embodiments, the comparator has an associated delay, allowing the power consumption to exceed the power budget for a duration of time without triggering selection of the second clock generator.

In some embodiments, the system comprises at least one memory storing a plurality of settings, wherein each setting comprises a frequency for the first clock generator and a frequency for the second clock generator, wherein the system comprises at least one processor configured to change from a first of the settings to the second of the settings by adjusting the frequencies set for the first dock generator and the second clock generator from frequencies defined by the first of the settings to frequencies defined by the second of the settings.

In some embodiments, the frequencies defined by the second of the settings are higher than the frequencies defined by the first of the settings, wherein the at least one processor is configured to perform the step of changing from the first of the settings to the second of the settings in response to a determination that the first dock generator has been selected for providing the processing unit dock signal for greater than a predefined amount of time.

In some embodiments, the at least one processor is configured to make the determination that the first dock generator has been selected for greater than a predefined amount of time in response to determining that the output signal of the comparator has selected the first dock generator for greater than the predefined amount of time.

In some embodiments, the frequencies defined by the first of the settings are higher than the frequencies defined by the second of the settings, wherein the at least one processor is configured to perform the step of changing from the first of the settings to the second of the settings in response to a determination that the second dock generator has been selected for providing the processing unit clock signal for greater than a predefined amount of time.

In some embodiments, the at least one processor is configured to make the determination that the second dock generator has been selected for greater than the predefined amount of time in response to determining that the output signal of the comparator has selected the second dock generator for greater than the predefined amount of time.

In some embodiments, the at least one processor is configured to, in response to detection of an overcurrent event, changing to a third setting by adjusting the frequencies set for the first dock generator and the second dock generator to frequencies defined by the third setting, wherein the third setting has lower values for the frequencies of the first and second dock generator than any of the other settings.

In some embodiments, the comparator for determining whether power consumption of the processing unit exceeds a set power budget is a first comparator, wherein the system comprises a second comparator configured to perform the detection of the overcurrent event, wherein the first and the second comparator are different, wherein the second comparator has a higher current threshold than the first comparator.

In some embodiments, the processing unit comprises multiple processors; and wires of a dock tree configured to distribute the processor dock signal to each of multiple processors.

In some embodiments, the wires are copper wires having a thickness greater than 0.2 micrometres.

BRIEF DESCRIPTION OF DRAWINGS

For a better understanding of the present invention and to show how the same may be carried into effect, reference will now be made by way of example to the accompanying drawings:

FIG. 15 is a schematic illustration of a bulk synchronous parallel OSP) computing model;

DETAILED DESCRIPTION

Embodiments of a first invention and embodiments of a second invention are both described below with reference to the accompanying Figures. These two inventions may be worked independently of one another or in combination. Firstly, a system that may implement the first and/or the second invention is described with reference to FIGS. 1 and 2.

Figure 1:
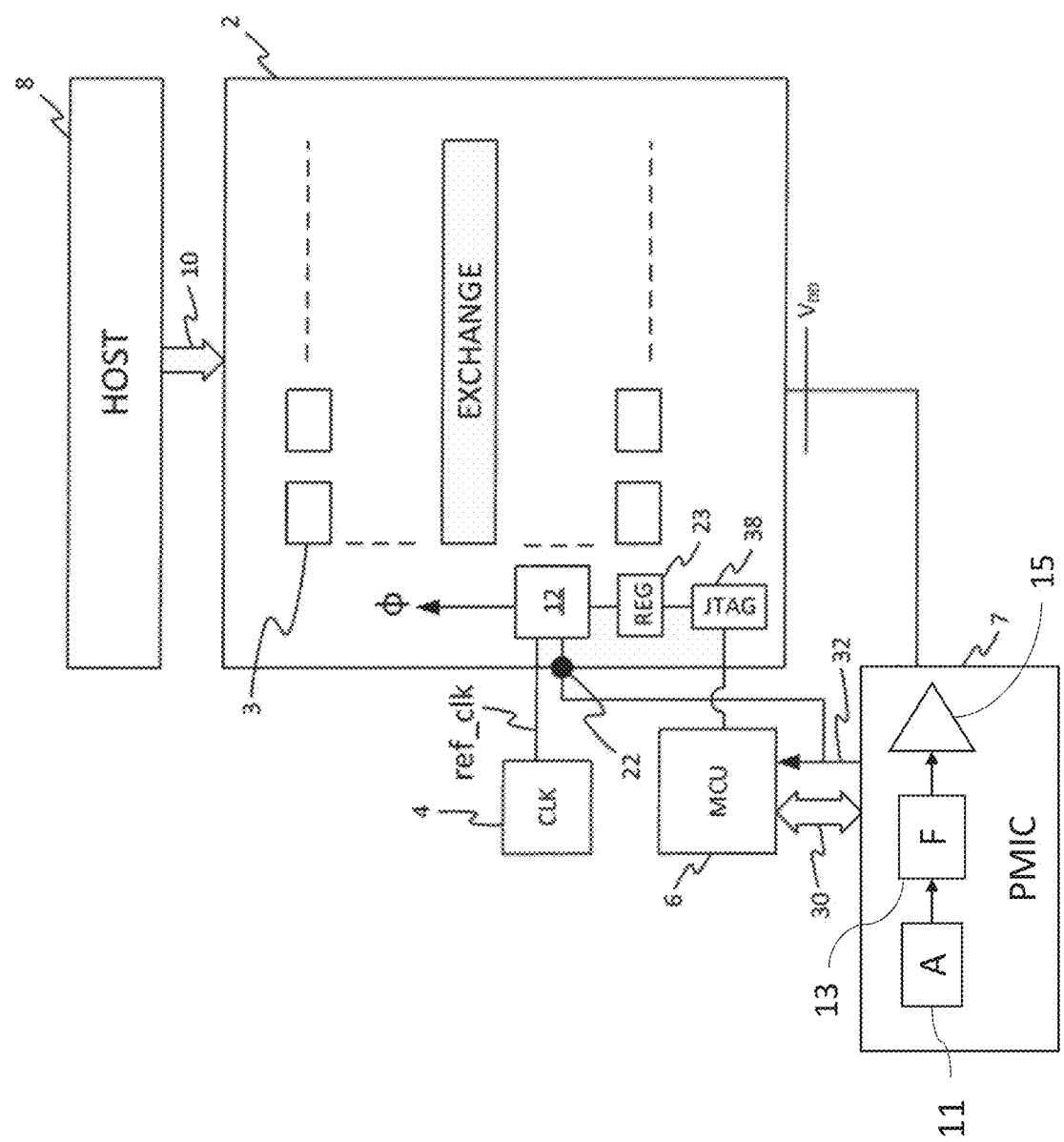
FIG. 1 is a schematic block diagram of a processing unit with a clock control system.

FIG. 1 is a schematic block diagram of a computer system that comprises a processing unit 2. The computer system may, for example, be a single chip processing unit comprising multiple processor (tiles) 3. The processing unit 2 is docked by a dock 4 which provides a reference clock ref_clk at a base frequency to the processing unit 2. The processing unit 2 is connected to a management control unit (MCU) module 6, which could be implemented on or off chip. The MCU 6 manages multiple services of the processing unit 2 and, in the present context, controls the frequency of a clock signal, which governs operation of the tiles 3 on the processing unit 2. A power management integrated circuit (PMIC) 7 provides power to the processing unit 2 through a supply rail labelled $V_{DD}$, and is connected to the MCU 6 via a two-way serial bus 30 and an interrupt pin (physical wire(s)) 32. The processing unit 2 may be an accelerator which is used to process workloads allocated to it by a host 8. The host 8 can supply workload data to the processing unit 2 via an interlace 10. There may be a single processing unit 2, or multiple instances of the processing unit 2 connected on a card and multiple cards in a rack. The processing units 2 may be of the type known as intelligence processor units (IPUs), which are designed to deal with workloads in the field of artificial intelligence or machine learning. A description of the IPU is given in U.S. application Ser. No. 15/886,065, which is incorporated by reference.

The clock 4 may serve one processing unit 2 or multiple processing units 2. The clock supplies the reference clock ref_clk to an on-chip clock generator module 12 via a card connector. The on-chip clock generator module 12 generates an IPU clock signal Φ, which is supplied to the tiles 3 on the processing unit 2. The physical clock lines supplying each tile 3 are not shown in FIG. 1 to avoid overcomplicating the diagram. Note that other parts of the processing unit 2, for example an exchange 5 which controls interfile communications, may be clocked by the clock signal Φ or by the reference clock (or by some other clock).

As an alternative to the clock 4 being supplied via a card connector or similar, there may be an on-board clock source. That is, the clock 4 may be implemented within the processing unit 2. The clock signal from the clock source 4 is the reference clock ref_clk from which the clock signal Φ for the operation of the processing units is derived. A system clock for some aspects of the chip logic could also be derived from ref_clk.

In accordance with embodiments of the invention, the clock generator module 12 receives the ref_clk signal and generates the IPU clock signal Φ as described herein.

The on-chip dock generator module 12 receives an input from an IPU dock selection pad 22, which is connected to the interrupt pin 32 of the PMIC 7. It also receives frequency control signals from the MCU 6 via JTAG interface 38.

Figure 2:
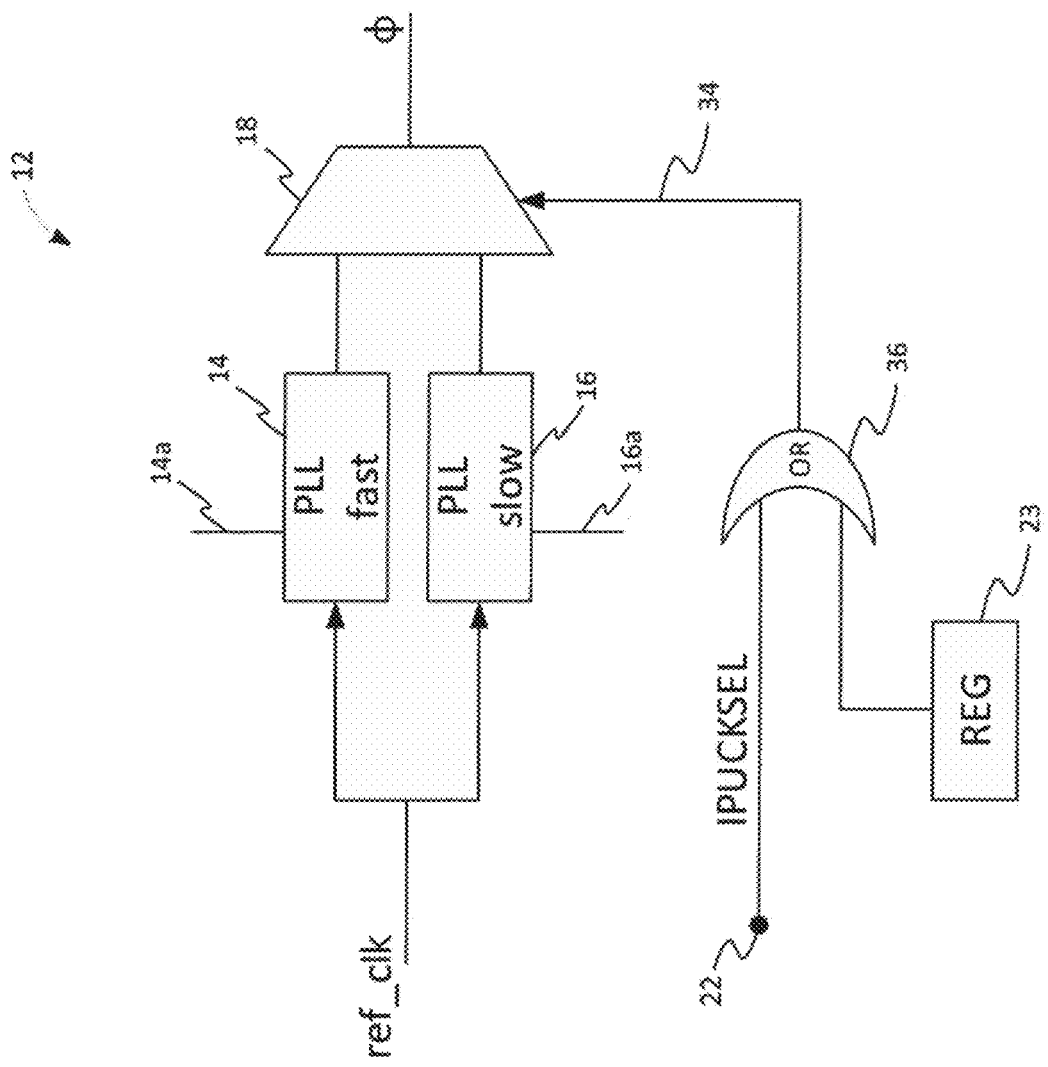
FIG. 2 is a schematic block diagram of a clock generator module.

The clock generator module 12 comprises two phase locked loops (PLL) 14, 16 which are shown in FIG. 2. It will be appreciated that while the clock generator module 12 is described as comprising various circuits, these circuits (PLLS, OR gate, MUX, register) need not be located in a particular block but could be distributed in the chip. The clock controller 12 is described, therefore, as a convenient way of explaining how embodiments of the invention operate to control generation of the IPU clock Φ. It is also noted that, although the clock signal generators 14, 16 are referred to as PLLS 14, 16, these components more generally could be any type of clock signal generators.

The PLLs 14, 16 receive the reference clock ref_clk. A first PLL 14 generates a so-called fast clock from ref_clk, and a second PLL 16 generates a so-called slow clock from ref_clk. A glitch free multiplexer 18 receives the outputs from the PLL's 14, 16 and can switch between the fast dock and the slow dock to provide the IPU dock Φ. The multiplexer 18 is controlled by a MUX control signal 34. It is described herein that the MUX control signal 34 is asserted high to control the multiplexer 18 to select the output of the slow PLL 16, and is not asserted (low) in the opposite condition. Of course, it is possible to use an opposite protocol, where the MUX control signal 34 would be asserted low to select the output of the slow PLL 16, and high in the opposite condition.

There are two mechanisms by which the MUX control signal 34 may be asserted and, therefore, by which the selection of the fast or slow PLL 14, 16 may be made. According to the first mechanism an alert from the PMIC 7, which is asserted on the interrupt pin 32 to the MCU 6, is also supplied to the Input pad 22 which feeds one input of the OR gate 36. This provides an immediate "throttling back" in the event of detection that the current has exceeded a current threshold. In FIG. 2, this signal received at input pad 22 is shown as IPUCKSEL. The second mechanism involves the MCU 6 writing a "1" into the register 23 such that (even if the IPUCKSEL Signal at the Input pad 22 is not asserted), the multiplexer 18 is controlled to have the application running from the slow PLL 16.

The frequencies at which the PLLs 14, 16 operate may be set based on signals received from the MCU 6 on wires 14a, 16a. The wires 14a, 16a may comprise two wires for carrying two different adaptation signals for adjusting the PLLs 14, 16. These signals are provided to the clock generator module 12 by the MCU 6 via a JTAG interface 38 as shown. In FIG. 2, reference numeral 14a denotes the adaptation signal for the fast PLL 14, and reference numeral 16a denotes the adaption signal for the slow PLL 16. The fast and slow PLL's may be of the same or different types.

Figure 3:
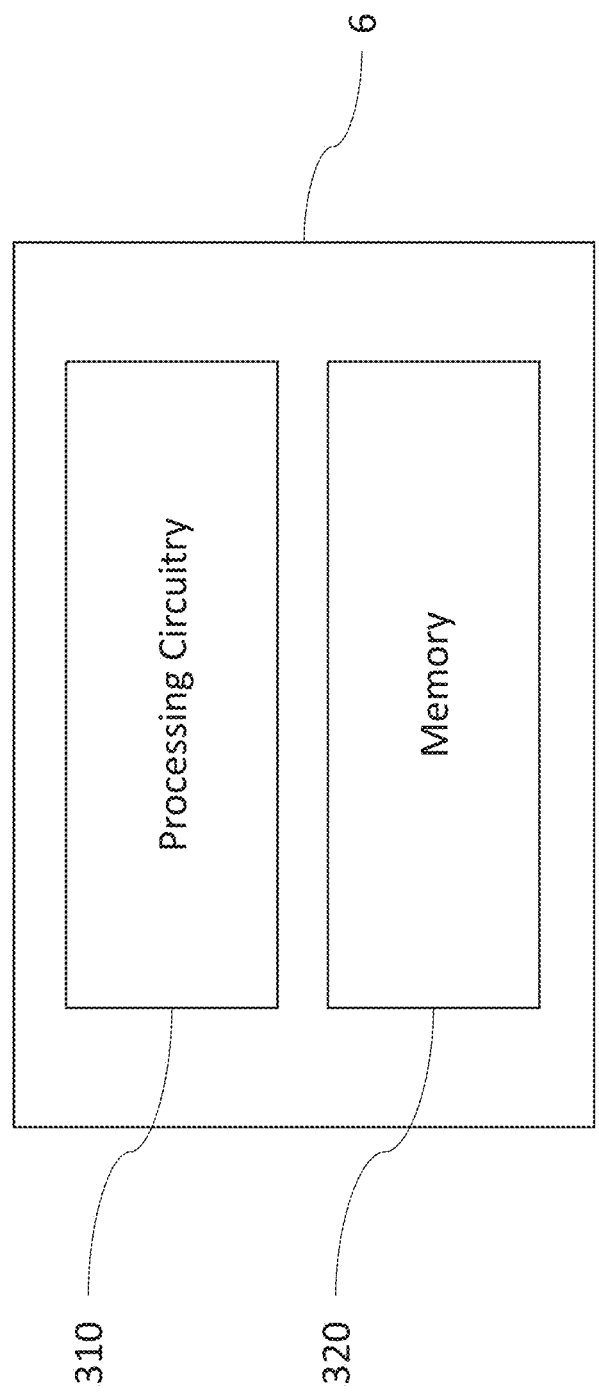
FIG. 3 is a schematic block diagram of a control apparatus for the clocks.

Reference is made to FIG. 3, which illustrates the MCU 6 in more detail. The MCU 6 comprises processing circuity 310 and at least one memory 320 for performing its functions as described herein. Preferably, the processing circuitry 310 is a processor, such as a CPU, configured to execute instructions stored in memory 320 to carry out its functions described. Additionally or alternatively, the processing circuitry 310 could comprise a field programmable gate array (FPGA) or application specific integrated circuit (ASIC) configured to carry out the functions described.

Embodiments of the first invention will now be described.

In embodiments of the first invention, cycling between the fast PLL 14 and the slow PLL 16 is carried out. In other words, there is a repeated/periodic switching between the fast PLL 14 and slow PLL 16. This results in the processing unit 2 being clocked at an average clock frequency having a value between the clock frequency of the fast PLL 14 and the clock frequency of the slow PLL 16. The average clock frequency depends upon the proportion of time during the cycle in which the fast PLL's 14 signal is provided to the processing unit 2 as compared to the proportion of time during the cycle in which the slow PLL's 16 signal is provided to the processing unit 2. The proportion of time on the fast PLL 14 vs the slow PLL 16 is dependent upon control signals received at the clock generation circuit 12. Therefore, the average clock frequency is increased in response to the control signals increasing the proportion of time spent on the fast PLL 14. Similarly, the average clock frequency is decreased in response to control signals decreasing the proportion of time spent on the fast PLL 14 vs the slow PLL 16. During these processes for increasing and decreasing the average clock frequency, the frequencies of the fast PLL 14 and the slow PLL 16 may remain fixed.

Each control signal received at the clock generation circuit 12 indicates whether or not a set power budget is being exceeded by the processing unit 2. A power budget is set for a particular application or workload that is to be executed by the processing unit 2. The power budget will normally be set by the host 8 and conveyed to the MCU 6 (via the processing unit 2 or directly), although other possibilities exist. For example, the MCU 6 may be aware of previous similar applications run for that chip and may be able to set the power budget based on storage of such historical data. In any event, the MCU 6 has an understanding of the power budget. Where there are multiple chips on a card, the MCU 6 will determine for each chip what the power budget for that chip might be. When running applications in the field of machine learning and artificial intelligence, the demands that are placed on the processing requirements imply that a power budget should be reached but not exceeded. That is, the aim is to run the chips as "hot" as is possible within the constraints of the power budget. The MCU 6 determines, based on the power budget, a current threshold to be managed by the PMIC 7. The MCU 6 communicates over bus 30 with the PMIC 7 to provide the indication of the power budget. This enables the PMIC 7 to determine a current threshold to be applied. In some embodiments, the PMIC 7 supplies a constant supply voltage VDD (for example, 0.8 Volts) to the supply rail of the processing unit 2, such that the current threshold can be derived by dividing the power budget by the supply voltage VDD. In other situations, there may be some complex calculations required to determine the current threshold that is to be used by the PMIC 7. The PMIC 7 comprise appropriate circuitry for calculating the current threshold.

The PMIC 7 comprises an ammeter 11 or other kind of sensor which is capable of producing a current measurement for detecting when the current threshold has been exceeded by the current drawn by the processing unit 2. The PMIC 7 is appropriately connected to the processing unit 2 to measure the current, although these connections are not shown in FIG. 1. The current is the current which is being drawn by the processing unit 2 to execute the application or workload.

The PMIC 7 also comprises a comparator 15 and a filtering circuit 13. The comparator 15 is configured to receive an indication of the current threshold. The comparator 15 is configured to compare the current threshold to the indication of the current supplied to the processing unit 2 to determine when the threshold is exceeded. The indication of the current supplied to the processing unit 2 that is input to the comparator 15 is received from the filtering circuit 13, The filtering circuit 13 is configured to receive a measurement of the current from the ammeter 11, The filtering circuit 13 filters the current measurement to provide a moving average of the current. The filtering circuit 13 may filter the current to a time constant of 60 microseconds.

The comparator 15 itself is associated with a certain delay. The size of the delay is dependent upon the time required for charging/discharging a capacitor of the comparator 15. The delay is such that if the comparator's received indication of current passes above the current threshold, the comparator 15 will not assert an output signal indicating as such until the received indication of current has been above the threshold for more than an amount of time. Similarly, if the comparator's received indication of current passes below the threshold, the comparator 15 will not assert an output signal indicating as such until the received indication of current has been below the threshold for more than an amount of time. The amount of time until the comparator 15 is triggered after the current has fallen below the threshold is dependent upon the time required for discharging the capacitor of the comparator 15. The amount of time until the comparator 15 is triggered after the current has risen above the threshold is dependent upon the time required for charging the capacitor of the comparator 15.

The comparator 15 receives the indication of the current and compares this with the current threshold. If the current threshold is exceeded, the comparator 15 causes a signal (IPUCKSEL) to be issued on wire 32. This signal is received at the clock input selection pad 22, and provided therefrom to the clock generator module 12. Referring to FIG. 2, the IPUCKSEL signal is received at the multiplexer 18 and used to select the slow PLL 16, such that the output of the slow PLL 16 is provided as the clock signal for the processing unit 2. Therefore, the PMIC 7 causes the slow PLL 16 to be selected in the case that an overcurrent event is detected.

On the other hand, if the comparator 15 determines that the indication of the current provided to the processing unit 2 is below the current threshold, the output of the comparator 15 is such that the IPUCLSEL signal is not asserted on the wire 32. As a consequence, the multiplexer 18 does not receive the IPUCLSEL signal and, therefore, the fast PLL 14 is selected. The output of the fast PLL 14 is provided to the processing unit 2 as the clock signal to the processing unit 2. Therefore, the PMIC 7 causes the fast PLL 16 to be selected in the case that no overcurrent event is detected.

The filtering provided by the filtering circuit 13 and the delay of the comparator 15 increases the amount of time required for the comparator's output to repeatedly switch between high and low in response to changes in the current measured by the ammeter 11 and, therefore, appropriately reduces the rate of switching between the fast PLL 14 and the slow PLL 16.

The frequencies of the fast PLL 14 and the slow PLL 16 are set such that during operation of the processing unit 2, the threshold clock frequency at which an overcurrent event occurs lies between the frequencies of the fast PLL 14 and the slow PLL 16. The fast and slow PLLs 14, 16 are able, therefore, to cover the dynamic range of the application. For example, the output frequency of the fast PLL could be 1.6 GHz, and the output frequency of the slow PLL could be 800 MHz. However, during a particular phase of execution of the application running on the processing unit 2, the threshold frequency above which an overcurrent event occurs may, for example, be 1.2 GHz. If the processing unit 2 is clocked above this frequency, the processing unit 2 will exceed the set power budget. If the processing unit 2 is clocked below this frequency, the processing unit 2 will not exceed the set power budget.

It would be appreciated that the threshold frequency is not a fixed amount throughout operation of the processing unit 2, but will vary depending upon the phase of the application executed by the processing unit 2. In particular, if the application is in a computationally intensive phase, the threshold frequency will be lower. If the application is in a less computationally intensive phase, the threshold frequency will be higher.

The clock signal $\Phi$ cycles between the output of the slow PLL 16 and the fast PLL 14 such that the average clock frequency is close to the threshold frequency. The average clock frequency that results from the selection by the output of the comparator 15 is slightly below the threshold frequency, keeping the average power consumed by the processing unit 2 below the power budget by a small amount.

Consider a case in which the fast PLL 14 is first selected. In this case, since the frequency of the clock signal $\Phi$ is above the threshold frequency, the ammeter 11 outputs an indication of the current that is above the threshold current. The comparator 15 determines from a filtered version of the indication of the current, that the threshold is exceeded and, in response, outputs a signal on line 32, which causes the slow PLL 16 to be selected. Once the slow PLL 16 is selected, since the frequency of the clock signal $\Phi$ is then below the threshold frequency, the ammeter 11 outputs an indication of the current that is below the threshold current. The comparator 15 determines from a filtered version of the indication of the current that the threshold is not exceeded and, in response, deasserts the signal on line 32, such that the fast PLL 14 is again selected. In this way, there is a dithering (i.e. cycling) between selection of the fast PLL 14 and the slow PLL 16.

The multiplexer 18 dithers between selection of the fast PLL 14 output and the slow PLL 16 output in such a way that the average current for the processing unit 2 is close to the threshold, providing good performance, whilst avoiding the power consumption exceeding the power budget when the power consumption is averaged over a sufficiently long time period.

Figure 4:
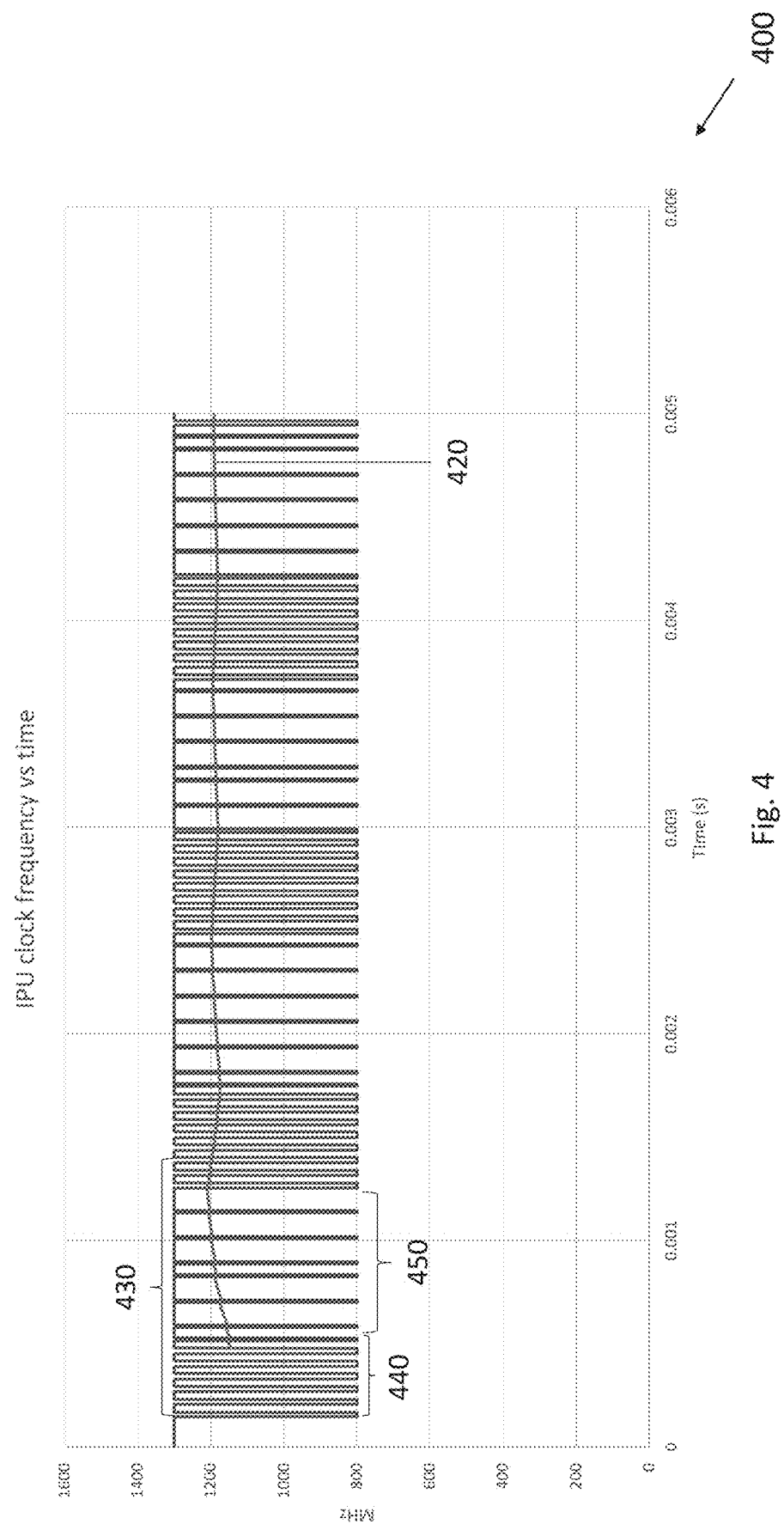
FIG. 4 illustrates an example of how the frequency of a clock signal provided for a processing unit may vary over time when a clock dithering method is employed.

An example of the dithering process that may be carried out during execution of an application on processing unit 2 is illustrated in FIG. 4. The graph 400 illustrates how the frequency of the clock signal $\Phi$ varies over time of execution of the application. The line 420 illustrates the average frequency of the clock signal $\Phi$ since t=0. In this example, the current threshold is set to 125 Amps. Above this current threshold, the power budget will be exceeded.

The example application of FIG. 4 exhibits an activity period of 1 ms. Within each period, the application has a phase of high computational intensity and a phase of low computational intensity. The pattern of high and low computational intensity phases repeats every 1 ms period. This type of pattern may occur when running applications that involve repeatedly performing the same set of operations in a cycle. One example of such an application is an application for training a neural network, which performs a plurality of training iterations, where each training iteration involves the same processes repeated using different data. When an application repeatedly performs the same set of operations, repeating patterns emerge in the activity level of the application. In the example shown in FIG. 4, the activity pattern has a period of 1 ms. An example of a period of the activity pattern is indicated by period 430. FIG. 4 shows, as part of the period 430, a phase 440 of high computational intensity, and a phase 450 of low computational intensity. As shown, each phase of high computational intensity and each phase of low computational intensity repeats every 1 ms.

Although, in the example of FIG. 4, each period of the application contains one phase of high computational intensity and one phase of low computational intensity, for other applications, a different pattern of activity may be exhibited, with more distinct phases in each period.

As is shown in the Graph 400, initially at t=0 the frequency of the clock signal Φ is set to the frequency of the fast PLL 14. Since, prior to the start of the application, the current through the processing unit 2 will be zero, the current measured by the comparator 15 is a filtered current and the comparator 15 has an associated delay, the comparator 15 will not detect that the current exceeds the threshold until some period of time into the operation of the application, even if the application is executing in a high intensity phase. This is reflected in FIG. 4, which shows that the frequency remains at the frequency of the fast PLL 14 for some time until the comparator 15 asserts a signal to indicate that the current threshold is exceeded.

Once the comparator 15 detects that the filtered current exceeds the threshold, the comparator 15 asserts a signal that causes the slow PLL 16 to be selected. This is shown at the first falling edge of the frequency in FIG. 4. Once the frequency has decreased, the comparator 15 detects that the filtered current has fallen below the threshold and, in response, desserts the signal that selects the slow PLL 16, such that the fast PLL 14 is once again selected to provide clock signal Φ to the processing unit 2. After the fast PLL 14 has been selected for a certain duration of time, the comparator 15 once again detects that the filtered current has exceeded the threshold and, in response, asserts the signal to switch to the slow PLL 16.

The phase 440 of the application's activity is a relatively high activity phase in which the processing unit 2 executes computationally intensive code. This is evidenced by the relatively small proportion of time spent on the fast clock compared to the other phase 450 of the application illustrated in FIG. 4. After phase 440, the application enters phase 450, which is a less computationally intensive phase. As shown, the proportion of time spent on the fast clock in phase 450 is greater than the proportion of time spent on the fast clock in phase 440. Therefore, the average clock frequency at which the processing unit 2 is operated at during phase 450 is greater than the average clock frequency at which the processing unit 2 is operated at during phase 440. This provides performance advantages, which are desirable since, during the low intensity phase of the application, the processing unit 2 can be clocked faster without exceeding the application's power budget.

As shown in FIG. 4, the average frequency 420 of the clock signal Φ converges towards a certain value over time. In this example, the value is 1190 MHz. For the application that is executing, this average clock frequency corresponds to an average current of 112.5 Amps. This average current is below the current threshold of 125 Amps set for the processing unit 2 in the example of FIG. 4. Therefore, the first invention achieves a good trade-off between performance of the processing unit 2, and not exceeding the power budget of the processing unit 2.

In some cases, the application's activity level can vary over very short timescales such that a switch from the fast PLL 14 to the slow PLL 16 need not occur if the time duration of a period of high activity is very short. This is enabled by the delay of the comparator 15, which only switches its output if there is a change in the current above the threshold for more than a certain period of time. For example, suppose an application enters a very computationally intensive phase for a short duration of time. In response to this change, the current drawn by the processing unit 2 exceeds the set threshold such that, after a certain amount of time, the filtered version of the current provided by filtering circuit 13 also exceeds the threshold. The comparator 15 receives the filtered indication of the current and, if the filtered indication of the current remains above the threshold by less than the time constant set of the comparator 15, the comparator 15 does not assert the signal to select the slow PLL 16. Therefore, the delay associated with the comparator 15 enables the application to enter the computationally intensive phase for a short time duration, without a switch to the slow PLL 16 taking place.

The invention has been described using a current comparator that, upon detecting a current that exceeds a threshold, causes a slow clock to be selected by asserting a signal. However, other implementations are possible. For example, the comparator 15 could, upon determining that the current was below a threshold, assert a signal to cause the fast clock to be selected and deassert the signal when the indication rises above the threshold. In other examples, another device (e.g. another input current monitor or a thermistor) other than the comparator 15 could be used to indicate whether or not a power budget is exceeded and therefore to control the switching between the fast and slow PLL 14, 16. In other examples, the MCU 6 could be programmed to control the cycling between the fast and the slow PLLs 14, 16 according to a predetermined schedule programmed into software or firmware of the MCU 6.

Embodiments of the second invention will now be described. Embodiments of the second invention are implemented in a system having a fast and a slow clock generator, such as the fast and slow PLLs 14, 16 shown in FIG. 2. As described, the fast PLL 14 and the slow PLL 16 may be used to maximise performance of the processing unit 2, whilst preventing a power budget from being exceeded. The example of this that has been described is the use of a dithering mechanism for cycling between the selection of the two PLLs 14, 16. However other schemes making use of two PLLs 14, 16 could be implemented. For example, in such a scheme, it could be provided that one of the PLLs 14, 16 is assigned to provide the processor clock Φ for most normal workload processing operations of the processing unit 2. However, if that PLL requires adjustment to a new frequency, the system switches to the other PLL, whilst the adjustment of the main PLL is carried out. Once the adjustment is complete, the system switches back to the main PLL. Such a scheme is referred to herein as the "step change" scheme and is described in detail U.S. application Ser. No. 16/428,797, which is incorporated by reference. Therefore, the second invention may be implemented in any system where switching between a fast and the slow clock generator for clocking a processing unit is carried out.

In the following description, embodiments of the second invention are described as being implemented in the system shown in FIG. 1.

One problem that can occur when using two PLLs 14, 16 for clocking a processing unit 2 is that, if the frequency gap between the fast and the slow clock frequency is too large, undesirably large voltage droop may occur on switching from the slow clock PLL 16 to the fast PLL 14. Such voltage droop results from a drop in impedance across the processing unit 2. The impendence, Z, across the processing unit 2 is related to the frequency, f, and the switched capacitance, $C_S$, by the relationship:

$$Z \propto \frac{1}{C_s f} \quad \text{Equation 1}$$

It may be understood from equation 1, that a sudden increase in the frequency of the clock signal Φ when the fast PLL 14 is selected, will lead to a sudden drop in impedance across the processing unit 2. This sudden drop in impedance causes the voltage across the processing unit 2 to droop before the PMIC 7 has time to react. The voltage droop is especially severe in the case that the application is entering a high activity phase at the moment that the frequency of the clock signal Φ increases. When the application enters a high activity phase, the processing unit's switched capacitance $C_S$ increases. As may be understood from equation 1, a sudden increase in both the dock frequency and the switched capacitance, will lead to a large drop in the impedance of the processing unit 2 and, therefore, a large voltage droop.

To address this problem, a maximum gap between the fast dock frequency and the slow dock frequency could be enforced. If the gap between these frequencies is constrained, the voltage droop resulting from a switch between the two frequencies may be limited to a more manageable level. However, constraining the gap in this way can make create problems when attempting to select an appropriate frequency at which to run the processing unit 2. This problem is illustrated with in FIGS. 5 and 6.

Figure 5:
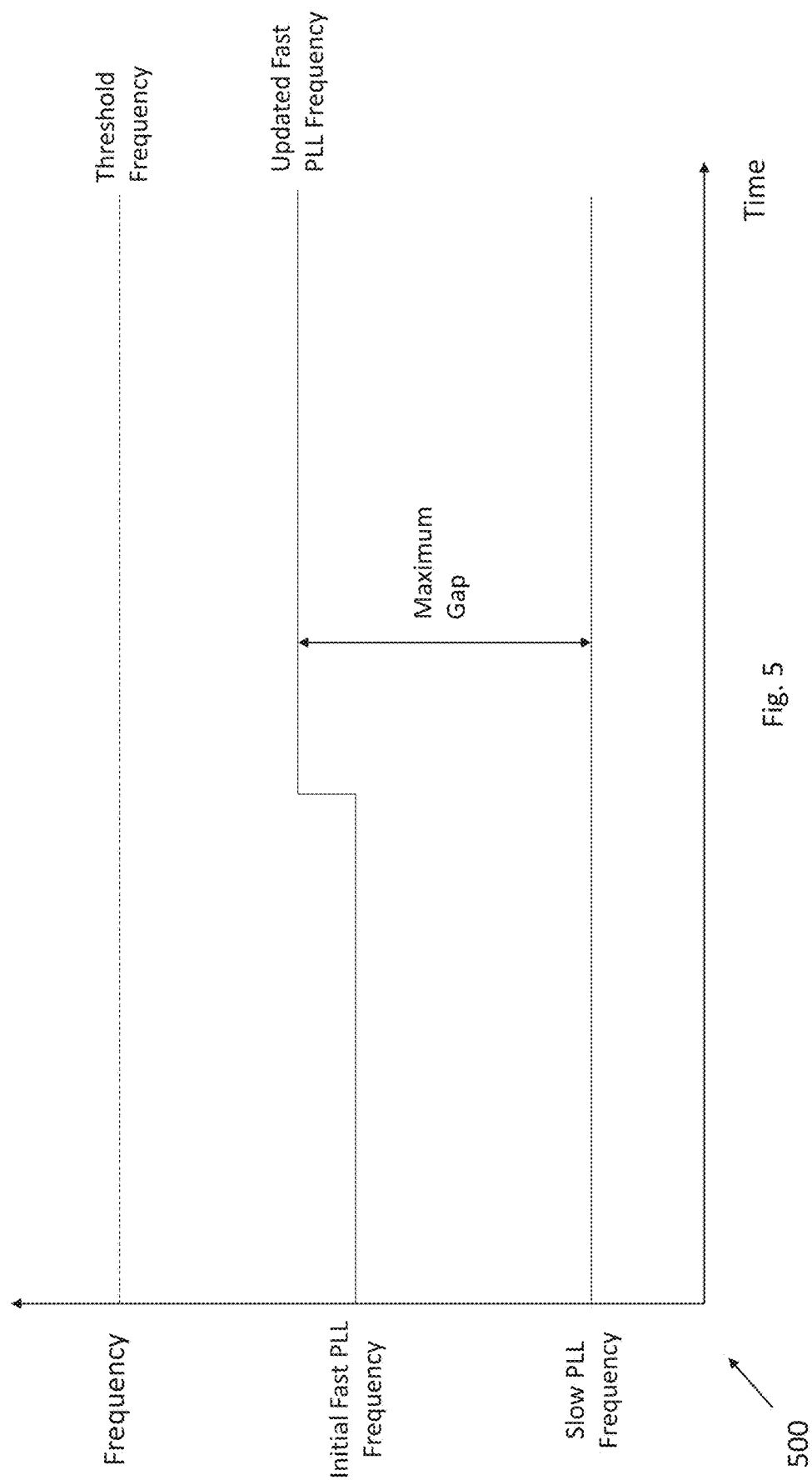
FIG. 5 illustrates an example of how the frequency of a clock signal provided for a processing unit may vary over time according to a proposal.

Reference is made to FIG. 5, which shows an example graph 500 illustrating how the frequency of the processing unit 2 may vary over time. The graph 500 shows the threshold frequency (above which an overcurrent event will occur) of the processing unit 2 during the time period shown. As discussed, it is desirable to run close to the threshold frequency (for performance reasons) without exceeding the threshold frequency (so as to avoid exceeding the power budget). As may be seen in FIG. 5, the fast clock frequency and the slow clock frequency are both set to levels that are well below the threshold frequency, making the processing unit's 2 performance suboptimal. Such a situation may occur when the application executing on the processing unit 2 has entered a low activity phase. To improve the performance of the processing unit 2 during this phase, one possible solution would be to increase the frequency of the fast PLL 14 to a new higher frequency as shown in FIG. 5. However, the maximum gap constraint imposed to limit voltage droop prevents the fast PLL 14 from being adjusted to a higher frequency level that would optimise performance.

Figure 6:
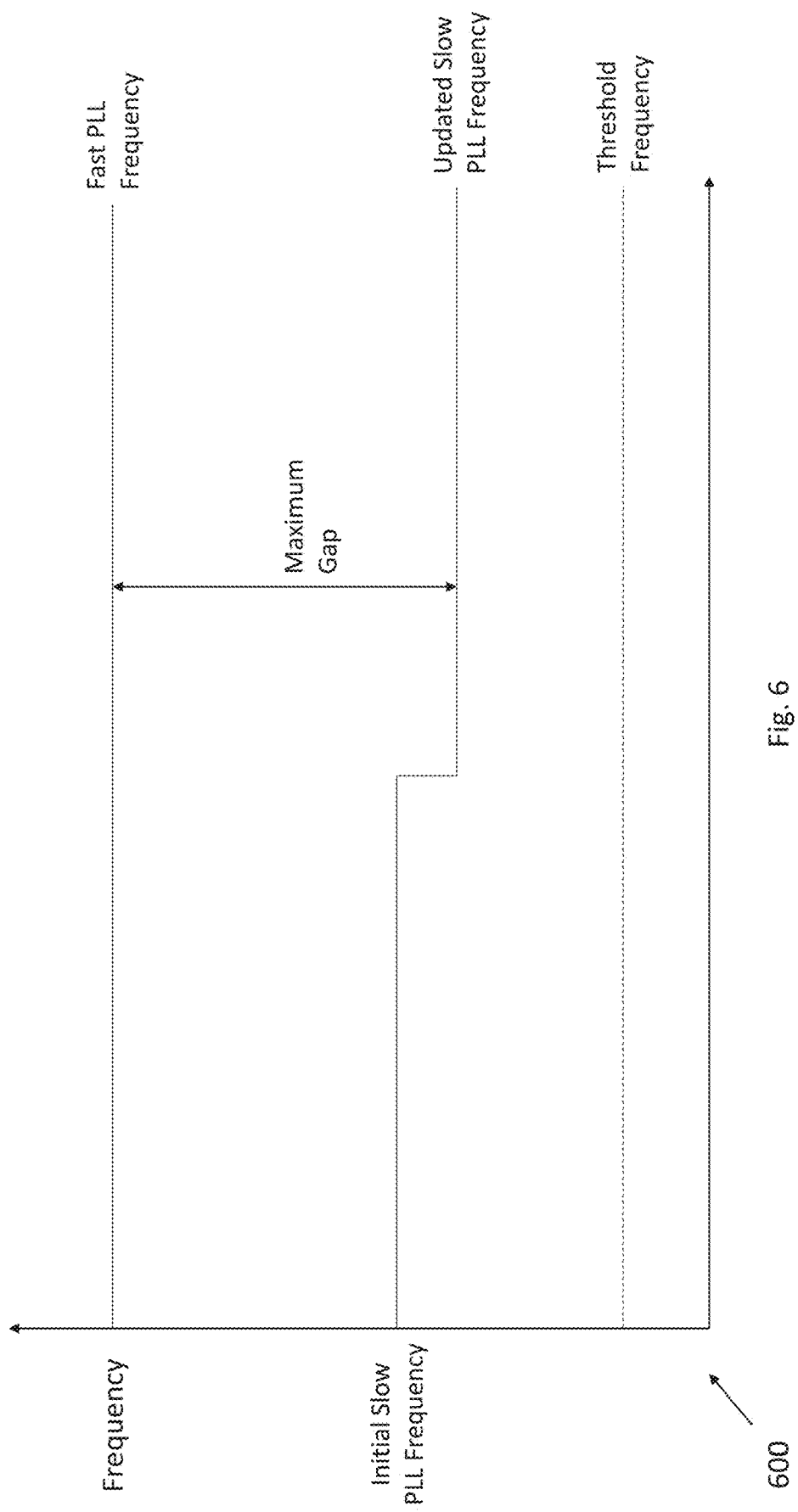
FIG. 6 illustrates a further example of how the frequency of a clock signal provided for a processing unit may vary over time according to a proposal.

Reference is made to FIG. 6, which shows a further example graph 600 illustrating how the frequency of the processing unit 2 may vary over time. The graph 600 shows the threshold frequency of the processing unit 2 during the time period shown. As discussed, although it is desirable to run the processing unit 2 fast for performance reasons, there is a set power budget which should not be exceeded. As is shown by the graph 600, the fast clock frequency and the slow clock frequency are both set to levels that are well above the threshold frequency, meaning that the power budget is exceeded. This may occur when the application executing on the processing unit 2 is in a high activity phase. To improve the performance of the processing unit 2, the frequency of the slow PLL 16 could be updated to a new lower frequency as shown in FIG. 6. However, the maximum gap constraint imposed to reduce voltage droop, prevents the slow clock from being reduced below the threshold frequency. Therefore, even after the update to the slow PLL's 16 frequency, the processing unit's 2 power consumption will still exceed the power budget.

According to embodiments of the second invention, a plurality of frequency settings are defined, each of these settings indicates a maximum frequency for the fast PLL 14 and a minimum frequency for the slow PLL 16, such that the gap between the two frequencies is kept to a manageable level. Each of the settings is referred to in this description as a 'gear'. The system switches between the gears as required. In response to a determination to increase the frequency of the clock signal Φ, a higher gear is selected at which the maximum and minimum frequencies defined for that gear are higher than the previous selected gear. Likewise, in response to a determination to decrease the frequency of the clock signal Φ, a lower gear is selected at which the maximum and minimum frequencies defined for that gear are higher than the previous gear.

As described above with reference to FIGS. 1 and 2, the MCU 6 is configured to provide control signals to the clock generator circuit 12 via JTAG interface 38 to adjust the frequencies of the fast and slow PLLs 14, 16. These control signals are shown provided on wires 14a, 16a to the fast and slow PLLs 14, 16. In embodiments of the second invention, when the MCU 6 determines, in response to received information, to change to a higher gear, the MCU 6 adjusts the frequencies of both PLLs 14, 16 to levels for the new gear by issuing signals on wires 14a, 16a. When changing to the new gear, the MCU 6 may set the frequency of the fast PLL 14 to the maximum frequency of the fast PLL 14 defined for that gear and may set the frequency of the slow PLL 16 to the minimum frequency of the slow PLL 16 defined for the new gear.

Figure 7:
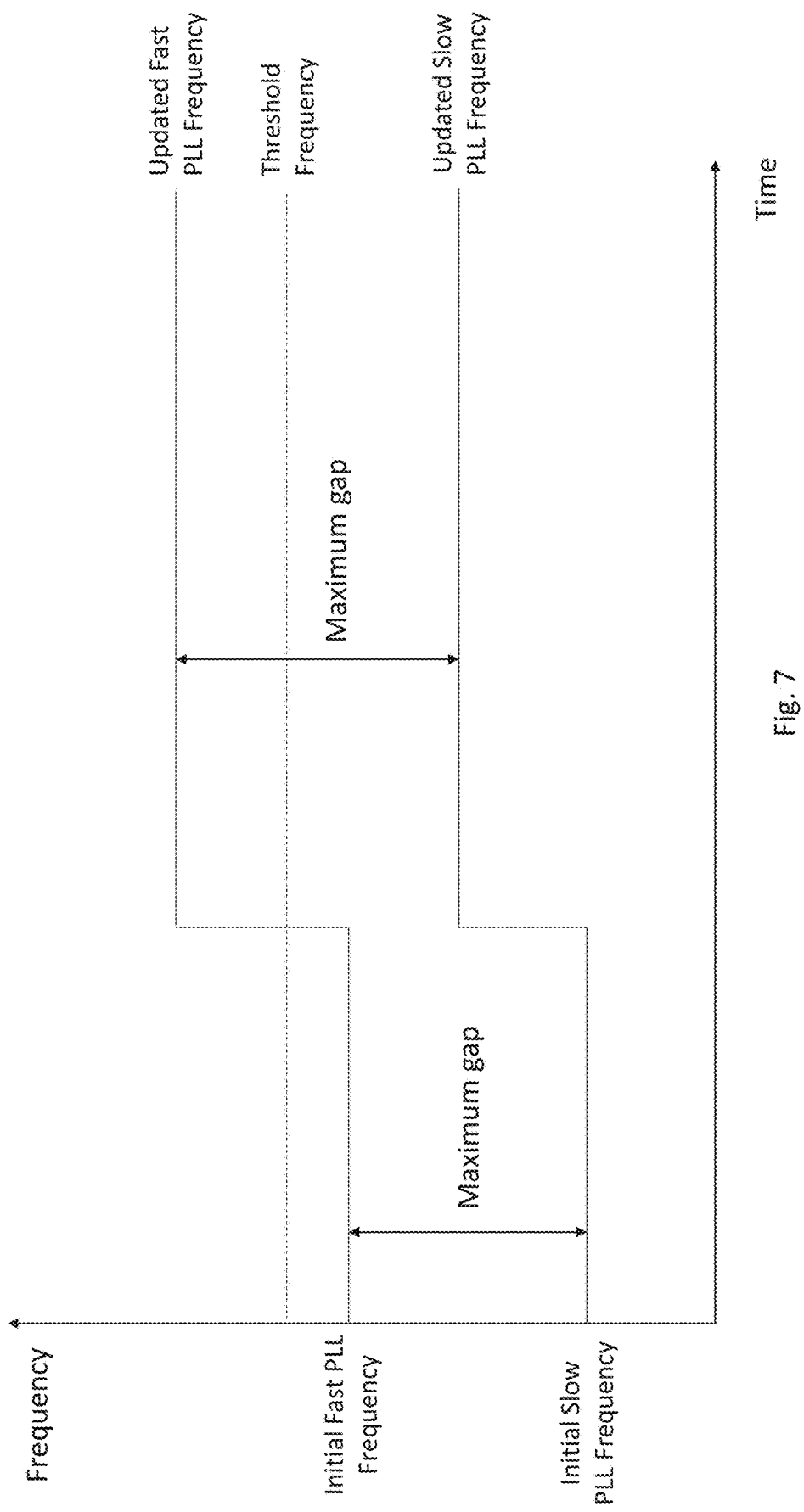
FIG. 7 illustrates an example of how the frequency of a clock signal provided for a processing unit may vary over time when a multi-clock control scheme for shifting between gears is provided.

Reference is made to FIG. 7, which illustrates how the fast clock frequency and the slow clock frequency may be adjusted from a lower gear to a higher gear in response to control signals received from the MCU 6. As shown in FIG. 7, the initial slow and fast clock frequencies are well below the threshold frequency. The initial slow and fast clock frequencies are set to the minimum slow clock frequency and the maximum fast clock frequency, respectively, for the lower gear. Following the receipt of control signals at the fast and slow PLLs 14, 16, the frequencies of those PLLs 14, 16 are updated as shown. These control signals set the slow and fast clock frequencies to the minimum slow clock frequency and maximum fast clock frequency, respectively, for the higher gear. The slow PLL 16 is updated to have a frequency greater than its initial frequency, but less than the frequency of the initial fast clock frequency. The fast PLL 14 is updated to have a frequency greater than its initial frequency.

The fast PLL's 14 updated frequency may be greater than the threshold frequency, as shown in FIG. 7. In this case, the fast PLL's 16 frequency may be reduced incrementally in until it is below the threshold frequency. Alternatively, the dithering between the fast and the slow PLLs 14, 16 described for the first invention may be performed so as to provide an average clock frequency of the clock signal Φ that is less than the fast PLL's frequency and less than the threshold frequency, but greater than the slow PLL's frequency.

Figure 8:
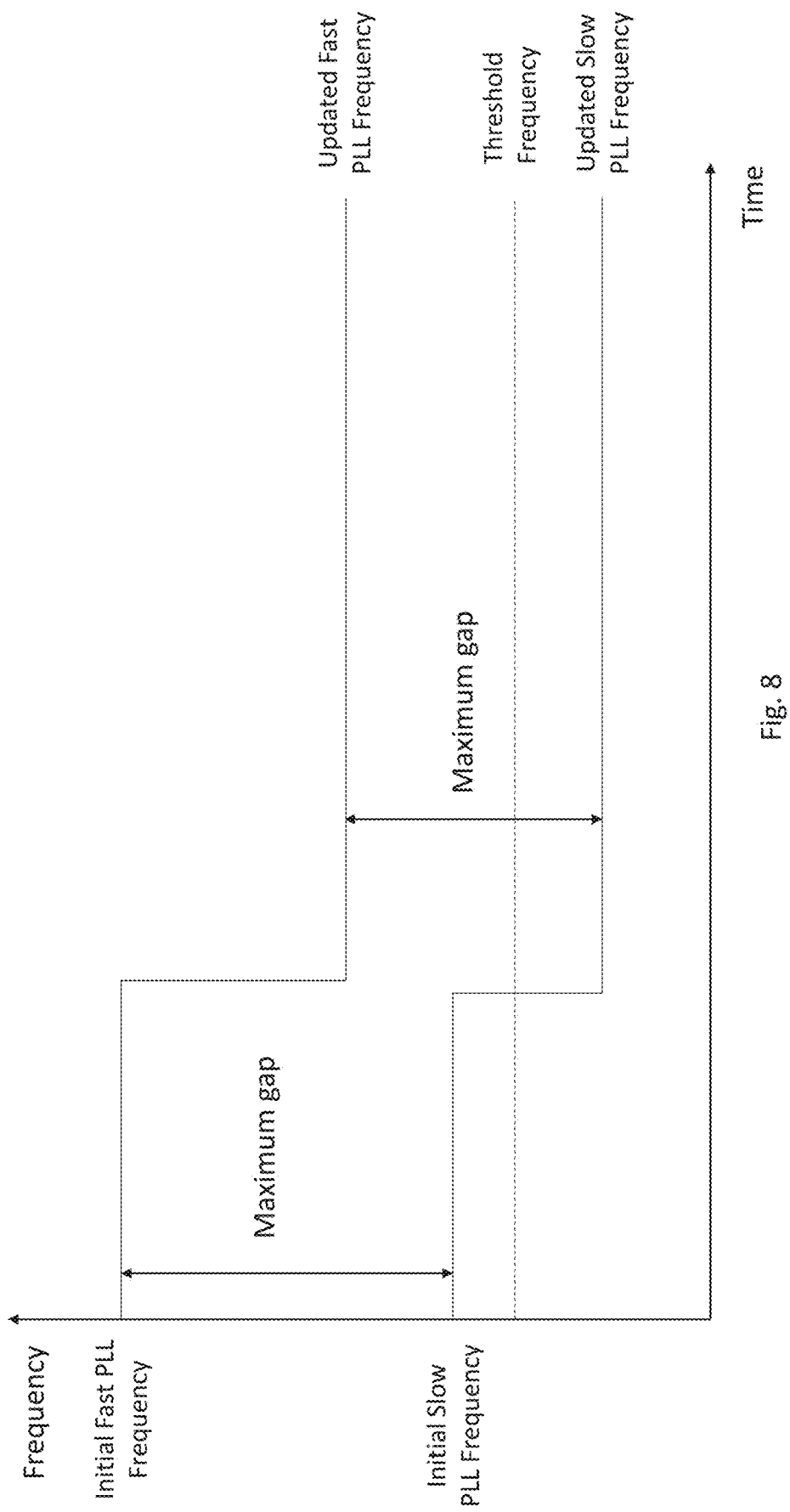
FIG. 8 illustrates a further example of how the frequency of a clock signal provided for a processing unit may vary over time when a multi-clock control scheme for shifting between gears is provided.

Reference is made to FIG. 8, which illustrates how the fast clock frequency and the slow clock frequency may be adjusted from a higher gear to a lower gear in response to control signals received from the MCU 6. As shown in FIG. 8, the initial slow and fast clocks are well below the threshold frequency. The initial slow and fast clock frequencies, in this example, are set to the minimum slow clock frequency and maximum fast clock frequency, respectively, for the higher gear. Following the receipt of control signals at the fast and slow PLLs 14, 16, the frequencies of those PLLs 14, 16 is updated as shown. These control signals set the slow and fast clock frequencies to the minimum slow clock frequency and maximum fast clock frequency, respectively, for the lower gear. The slow PLL 16 is updated to have a frequency less than its initial frequency. The fast PLL 14 is updated to have a frequency less than its initial frequency, but greater than the frequency of the initial slow clock frequency.

The updated fast clock frequency may be greater than the threshold frequency, as shown in FIG. 8. In this case, the fast PLL's 14 frequency may be reduced incrementally in until it is below the threshold frequency. Alternatively, the dithering described for the first invention may be performed so as to provide an average dock frequency of the dock signal Φ that is less than the threshold frequency.

The process of moving from a lower gear to a higher gear—where the higher gear has higher values for the maximum fast dock frequency and the minimum flow clock frequency than the lower gear—is referred to herein as 'shifting up a gear' or 'increasing the gear' or the like. Similarly, the process of moving from a higher gear to a lower gear—where the higher gear has higher values for the maximum fast clock frequency and minimum flow clock frequency than the lower gear—is referred to as 'shifting down a gear' or 'decreasing the gear' or the like. A gear increase or decrease may be performed in response to detection of a certain condition by the MCU 6.

As shown in FIGS. 7 and 8, adjacent gears are overlapping, such that when the frequencies of the fast and the slow PLLs 14, 16 are increased by a gear, the updated slow PLL 16 frequency is less than the former fast PLL 14 frequency on the lower gear. Similarly, when the frequencies of the fast and the slow PLLs 14, 16 are decreased by a gear, the updated fast PLL 16 frequency is greater than the former slow PLL 14 frequency on the higher gear. This overlap allows full coverage by the gears of an application's dynamic range, allowing any frequency (less than a possible maximum achievable by the fast PLL 14) of clock signal Φ to be provided.

As shown in FIGS. 7 and 8, by defining a maximum and minimum frequency for each gear, a maximum gap is enforced by the MCU 6 between the initial fast and slow clock frequencies. It is noted that during the process of changing gears, as will be understood from FIG. 10, the maximum frequency gap between the two PLLs 14, 16 may be exceeded. However, no switching from the slow PLL 16 to the fast PLL 14 occurs during this gear change process and, therefore, the droop problem associated with a large frequency gap is not encountered. Once the gear change process is complete, the new frequency values of the PLLs 14, 16 will not exceed the maximum defined for the new gear.

In some embodiments, the gap between the maximum and minimum frequencies may be constant, i.e. the frequency gap defined for each gear is the same. In other embodiments, the gap may vary depending upon the gear. In this case, the lower gears have a smaller gap between the maximum fast PLL 14 frequency and the minimum slow PLL 16 frequency than the higher gears. This is permissible since, at lower frequencies, changes in the processor clock frequency will produce larger changes in impedance (as may be understood from equation 1) and hence larger voltage droop effects.

As noted, the MCU 6 stores settings defining each of the gears. Each of these gears is defined by a maximum frequency for the fast PLL 14 and a minimum frequency for the slow PLL 16. In some embodiments, when in a particular gear, the MCU 6 may be able to set the frequency of the fast PLL 14 to a lower frequency than its maximum frequency set for that gear. The frequency of the slow PLL 16, on the other hand, may be fixed, i.e. the MCU 6 will not adjust the frequency of the slow PLL 16 to be greater than the defined minimum for the gear. In other embodiments, the MCU 6 may vary the frequency of the slow PLL 16, whilst in a certain gear, whilst keeping the frequency of the fast PLL 16 fixed. In some embodiments, the frequency of both PLLs may remain fixed whilst in a particular gear.

Therefore, although the frequencies defined for a gear are referred to as 'maximum' and 'minimum' frequencies, in some embodiments, the frequencies of the fast and the slow PLLs 14, 16 may not deviate from these frequencies when in a particular gear. In other words, the 'maximum' and 'minimum' frequencies may be the only frequencies for that gear. This may be the case when the dithering scheme is applied when in a gear. In other embodiments, the frequency of the fast PLL 14 may be reduced below the maximum frequency defined for the gears. This may the case when the step change scheme is applied when in a gear.

Figure 9:
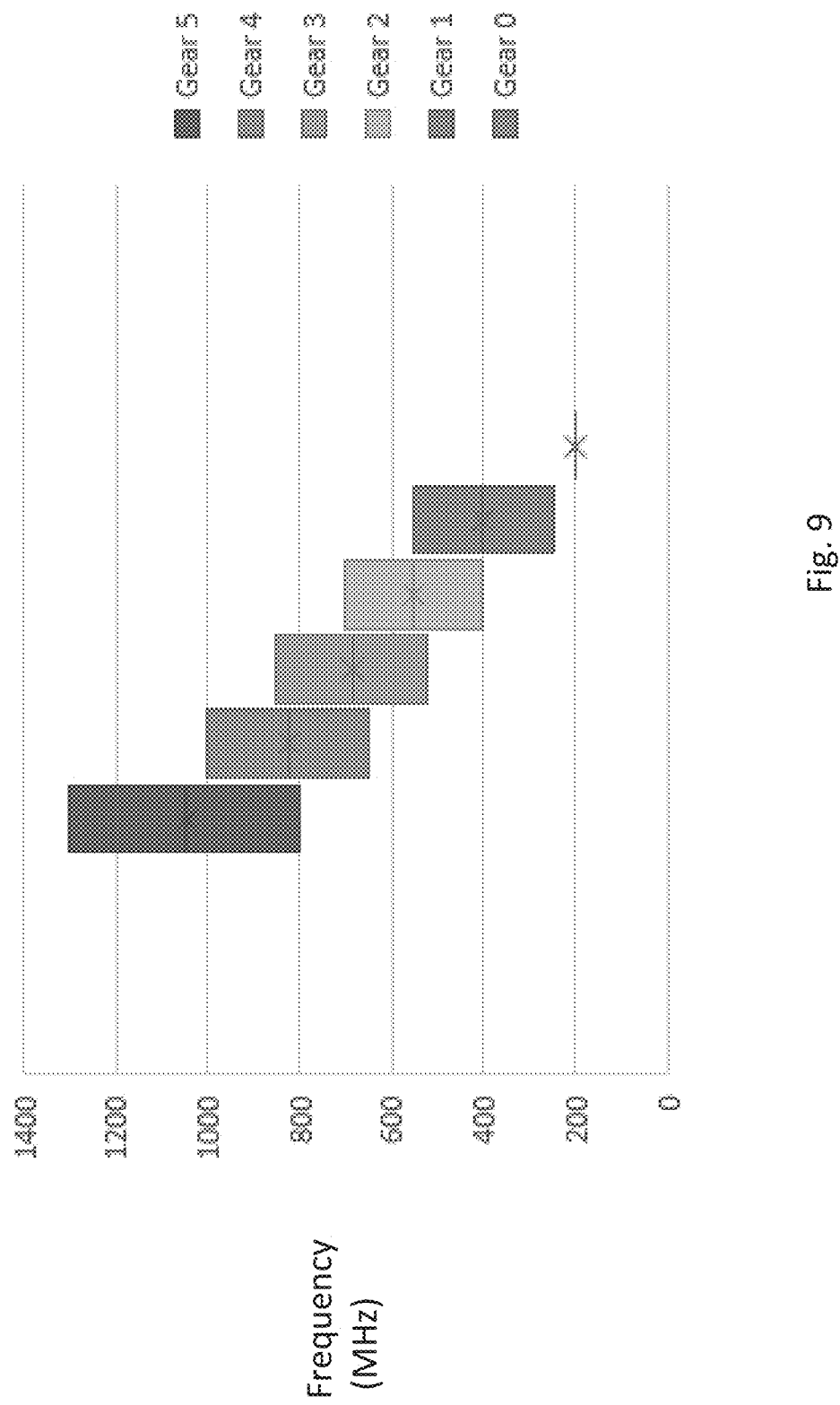
FIG. 9 illustrates an example of a set of gears that may be used for the two clock generators in the system.

Reference is made to FIG. 9, which illustrates an example of the different gears that may be applied by the MCU 6 when adjusting the frequencies of the fast and slow PLLs 14, 16. The Figure shows four different gears, each having a different maximum frequency for the fast PLL 14 and a different minimum frequency for the slow PLL 16. As shown, for the plurality of gears, the gap between the minimum frequency and the maximum frequency increases monotonically with the magnitude of the minimum and maximum frequencies.

It will now be described how the MCU 6 determines to change gears and how the updates to the gear changes may be implemented in different embodiments. In brief summary, the MCU 6 determines to shift up by one gear in response to a determination that the fast PLL 14 has been selected for greater than a predefined duration of time. There are two ways in which the MCU 6 may determine to shift down by one or more gears. In one embodiment, the MCU 6 determines to shift down by a gear in response to determining that the slow PLL 16 has been selected for greater than a predefined amount of time. This technique is used when the second invention is implemented using the dithering scheme. In another embodiment, the MCU 6 determines to shift down by two gears in response to determining that the fast PLL 14 frequency is equal to or less than the frequency of the slow PLL 16. This technique is implemented when the second invention is implemented using the step change scheme.

The determination that the fast PLL 14 or slow PLL 16 has been selected for greater than a predefined amount of time is determined in the following way by the MCU 6, As described above with respect to FIG. 1, the comparator 15 receives an indication of the current measured by the ammeter 11. This indication is a filtered measurement of the current received from the filtering circuit 13. In response to determining that the current threshold is exceeded, the comparator 15 causes a signal to be provided on wire(s) 32 to the clock generator circuit 12 and to the MCU 6. The signal, when received at the clock generator circuit 12, causes the slow PLL 16 to be selected. When the signal is deasserted, the fast PLL 14 is again selected.

Since the MCU 6 receives the same signal on wire(s) 32 that controls the clock selection, the MCU 6 is able to determine when the fast PLL 14 is selected and when the slow PLL 16 is selected. The MCU 6 uses this information to determine when a gear shift in the frequencies is required. The MCU 6 determines that a gear shift is to be performed when one of the PLLs 14, 16 has been selected for greater than a predetermined length of time. For example, the MCU 6 may determine that the frequencies of the PLLs 14, 16 are to be shifted up when the fast PLL 14 has been selected for more than a predetermined amount of time (e.g. 200 microseconds). Similarly, the MCU 6 may determine that the frequencies of the PLLs 14, 16 are to be shifted down, when the slow PLL 16 has been selected for less than a predetermined amount of time (e.g. 200 microseconds).

Figure 10A:
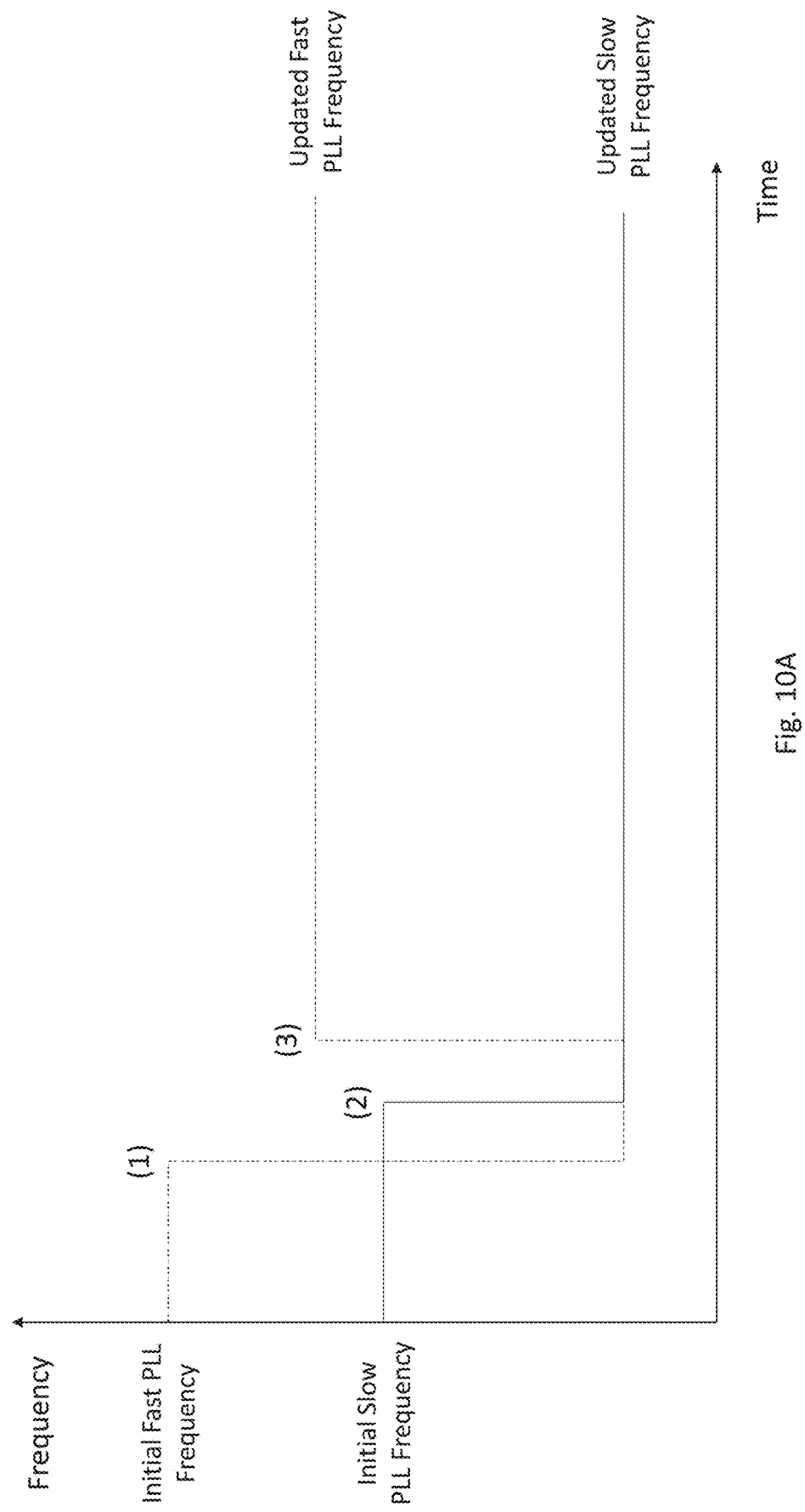
FIG. 10A illustrates the process of shifting the frequencies of the clock generators down by a gear.

Reference is made to FIG. 10A, which illustrates an example process for shifting down a gear in response to determining that the slow PLL 16 has been selected by more than a predefined amount of time. This mechanism may be applied when the clock dithers between the fast PLL 14 and the slow PLL 16. In FIG. 10A, the fast PLL frequency is indicated by the dashed line, whereas the slow PLL frequency is indicated by the solid line. Initially, the MCU 6 selects the slow PLL 16 by writing to the register 23. At step (1) shown in FIG. 10A, the MCU 6 sends a signal on wire 14a to adjust the frequency of the fast PLL 14 down to the new frequency for the slow PLL 16. Following this, the MCU 6 deselects the slow PLL 16 by clearing the register 23, so that the fast PLL 14 is selected. At step (2) shown in FIG. 10A, the MCU 6 then sends a signal on wire 16a to adjust the slow PLL 16 down to the new frequency for the slow PLL 16. Following step (2), the MCU 6 again writes to the register 23 to select the slow PLL 16. At step (3), the MCU then sends a signal on wire 14a to adjust the fast PLL 14 up to the new frequency for the fast PLL 14. The process of moving down a gear is then complete. This technique for changing down by a gear prevents the gap between the fast and slow clock frequencies from exceeding a maximum, and provides that, during the gear transition process, the clock signal Φ is provided by the one of the two PLLs 14, 16 with the lowest frequency.

Although the example of FIG. 10A shows the fast PLL 14 frequency being reduced (at step (1)) to the updated slow PLL frequency, in other embodiments the fast PLL 14 frequency may be reduced to a different frequency that is lower than the updated fast PLL 14 frequency, but which still reduces the gap between the fast PLL 14 frequency and the slow PLL 16 frequency during the transition process.

It is noted that although the fast PLL 14 is referred to as 'fast clock' throughout the description, for part of the transition process shown in FIG. 10A, the clock signal that it produces is at a lower frequency than the signal produced by the slow PLL 16. Therefore, it is not a requirement that the fast PLL 14 always outputs a signal at a higher frequency than the signal of the slow PLL 16, even if this is so when not shifting down a gear.

Figure 10B:
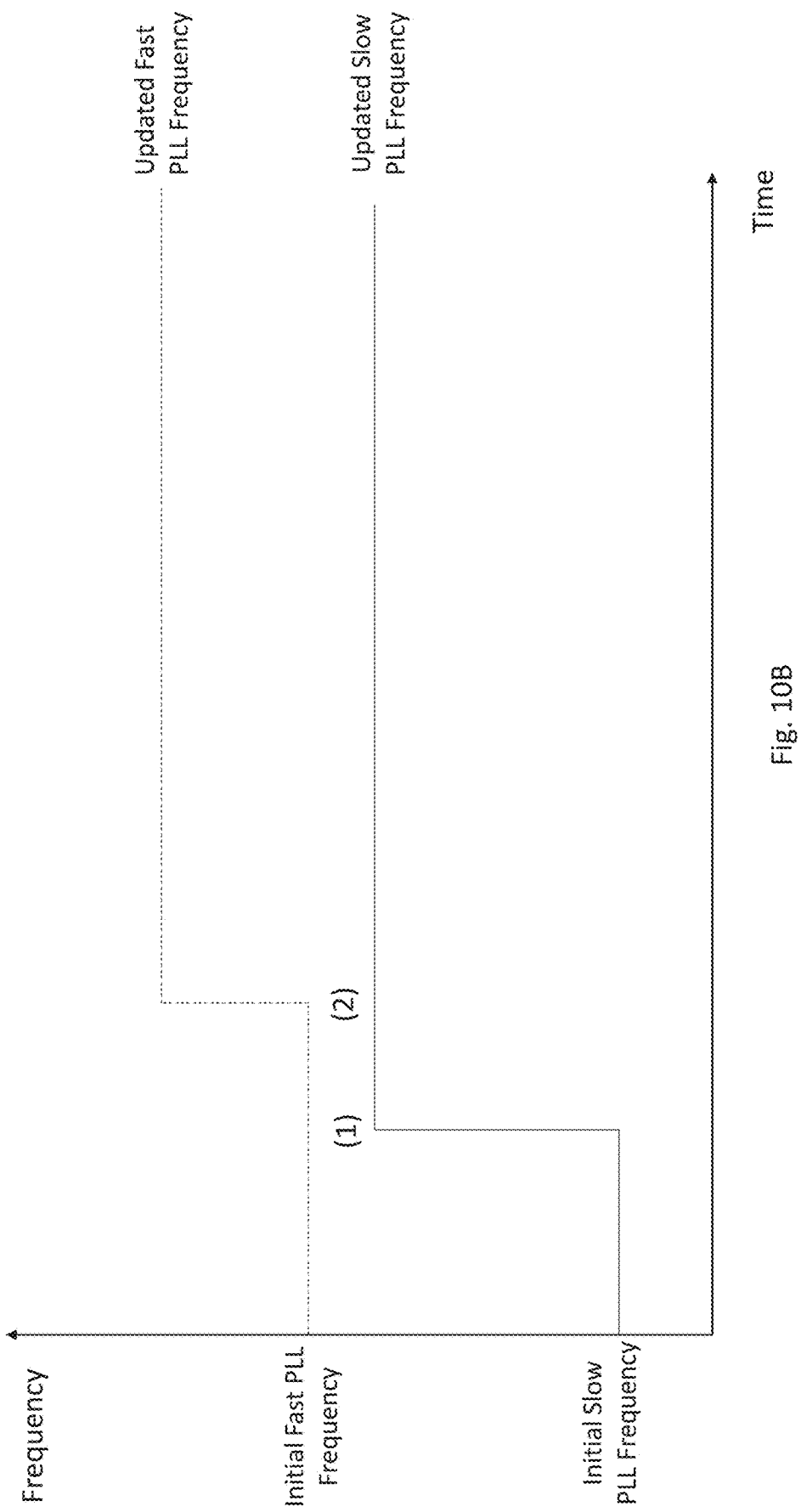
FIG. 10B illustrates the process of shifting the frequencies of the clock generators up by a gear.

Reference is made to FIG. 10B, which illustrates the process of shifting up a gear in response to determining that the fast PLL 14 has been selected by more than a predefined amount of time. This mechanism may be applied both when the clock dithers between the fast PLL 14 and the slow PLL 16 and when the step change in the fast PLL 14 frequency scheme is applied. In FIG. 10B, the fast PLL frequency is indicated by the dashed line, whereas the slow PLL frequency is indicated by the solid line. Initially, the MCU 6 selects the fast PLL 14. At step (1) shown in FIG. 10B, the MCU 6 then sends a signal on wire 16a to adjust the slow PLL 16 to the new slow frequency. The MCU 6 then selects the slow PLL 16 by writing to the register 23. At step (2), the MCU 6 then sends a signal on wire 14a to adjust the fast PLL 14 to the new fast frequency. The process of moving up a gear is then complete.

In some cases, after a gear shift has occurred, the condition that caused the gear shift will be removed. For example, output of the fast PLL 14 is selected for greater than the predetermined amount of time (e.g. 200 microseconds), when a gear change occurs to move to a higher gear, the higher gear may be such that the threshold frequency falls between the updated fast and slow frequencies. In this case the clock signal Φ will no longer remain stuck on the fast PLL 16, but the system can either dither between the fast and the slow PLL 14, 16 or reduce the fast PLL 16 frequency in accordance with the step change scheme so as to appropriately manage the frequency of the clock signal Φ. However, if the condition is not removed, and the clock signal Φ remains on the output of the fast PLL 14 for another instance of the predetermined amount of time (e.g. 200 microseconds), then the MCU 6 may issue signals to cause a further gear change to a higher gear. The MCU 6 will continue to change gears until the condition is removed or until the highest gear is reached, e.g. where the fast PLL 14 outputs its highest possible frequency.

Figure 11:
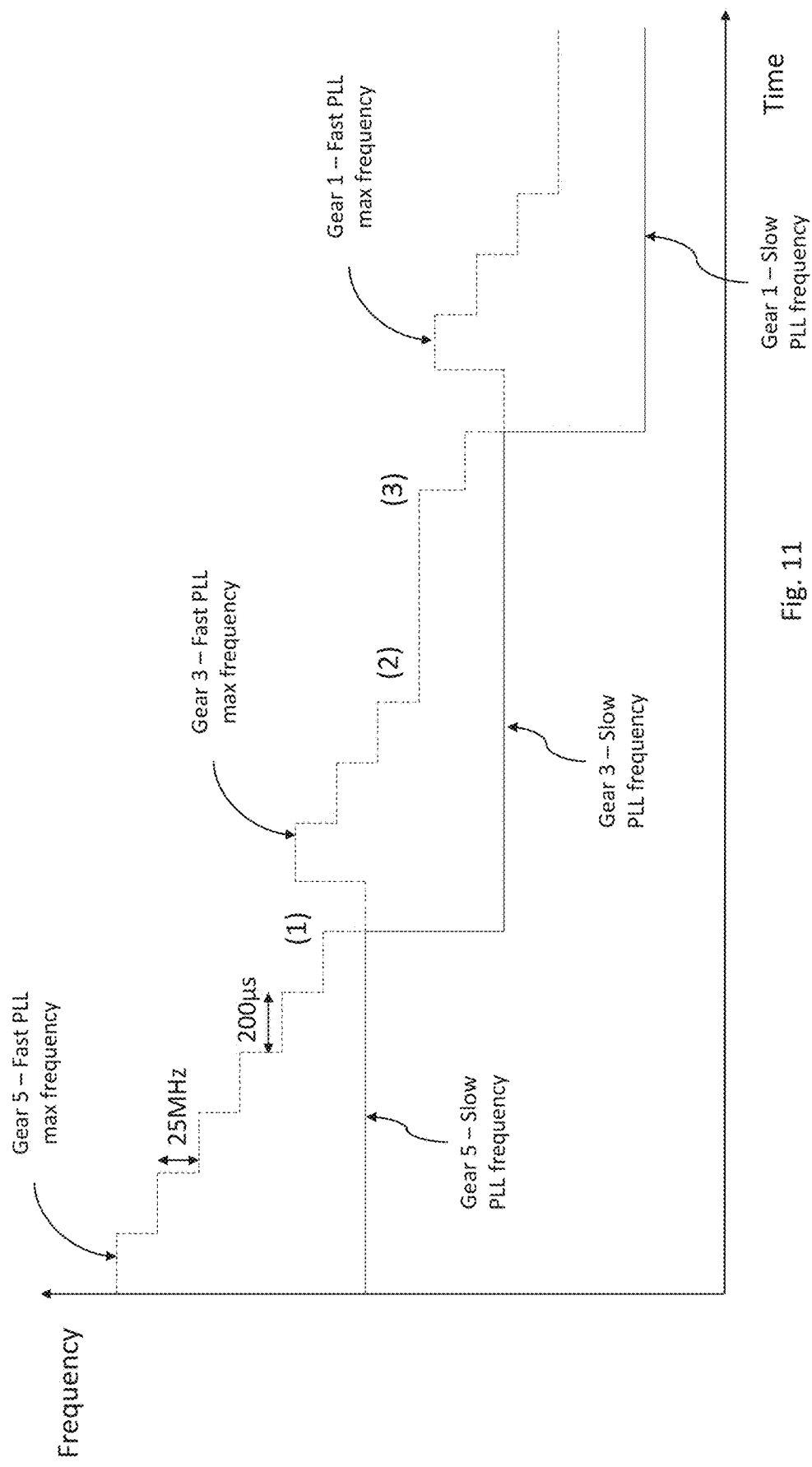
FIG. 11 illustrates an example timeline showing how the frequencies of the clock signals change over time when the gearbox scheme is used.

The process used for moving down a gear when the dithering scheme is used has been described above with respect to FIG. 10A. Reference is now made to FIG. 11, which illustrates an alternative process for shifting down gears. In this example, a shift to a lower gear is performed in response to the fast PLL 14 frequency being set substantially equal to or less than the frequency of the slow PLL 16. This mechanism may be applied when the fast PLL 14 is adjusted in steps so as to provide an appropriate frequency. In FIG. 10A, the fast PLL frequency is indicated by the dashed line, whereas the slow PLL frequency is indicated by the solid line.

In the example shown in FIG. 11, each gear shift involves shifting down by two gears. However in other embodiments each gear shift could involve shifting down by a different number of gears.

Initially, the PLLs 14, 16 are set to a gear that is referred to as gear 5. Upon an overcurrent event being detected by the comparator 15, the slow PLL 16 is selected, and the MCU 6 adjusts the frequency of the fast PLL 14 down by 25 MHz. The fast PLL 14 is then selected again. If the overcurrent event persists, the process of reducing the fast PLL 14 frequency by 25 MHz is again performed.

It is seen that after this process has been repeated so many times without the removal of the overcurrent event, the fast PLL's 14 frequency may be reduced to the frequency of the slow PLL 16. This marked by point (1) in FIG. 11. Upon determining that the fast PLL 14 frequency is the same as the slow PLL 16 frequency, the MCU 6 implements a gear change to a lower gear. To achieve this, the fast PLL 14 is selected, whilst the frequency of the slow PLL 16 is reduced to the slow PLL 16 frequency defined for gear 3. Then the slow PLL 16 is selected, whilst the MCU 6 increases the frequency of the fast PLL 14 to the maximum fast PLL 14 frequency for gear 3. The fast PLL 14 is then selected.

Following the gear change, an overcurrent event is again triggered, causing the fast PLL 14 frequency to be reduced in steps again. At point (2) shown in FIG. 11, after reducing the fast PLL 14 frequency in steps, the overcurrent event no longer occurs when the fast PLL 14 is selected. As a result, the fast PLL 14 may remain selected without triggering the overcurrent event.

After a certain amount of time, the application behaviour may move into a more computationally intensive phase. As shown at point (3) in FIG. 11, this causes the fast PLL 14 frequency to again be reduced in steps. Once the fast PLL 14 frequency is again equal to the slow PLL 16 frequency, the MCU 6 determines to perform a gear change to gear 1 as shown. The fast PLL 14 frequency is increased to the maximum frequency for gear 1 and then lowered in steps until the overcurrent event is removed when the fast PLL 14 is selected.

Figure 12:
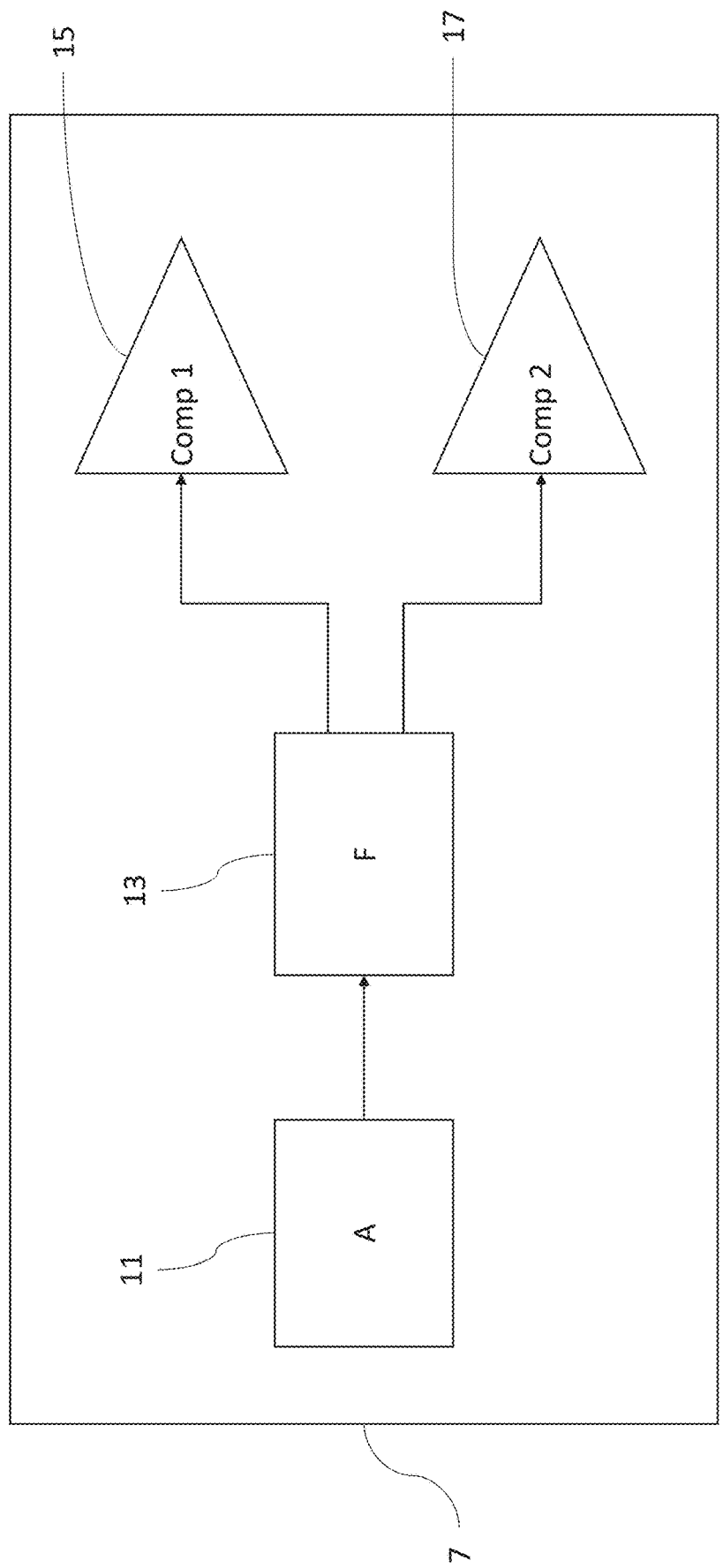
FIG. 12 illustrates an example power management controller in more detail.

In some embodiments, in addition to the comparator 15, whose output controls the shifting up and down by a gear, the PMIC 7 may contain a further comparator (not shown in FIG. 1). Reference is made to FIG. 12, which illustrates an example of the PMIC 7 according to embodiments of the second invention. The PMIC 7 includes the ammeter 11, filtering circuit 13, and comparator 15, shown in FIG. 1 and already discussed. The PMIC 7 additionally includes a further comparator 17 that receives an indication of the current as measured by the ammeter 11. This indication of the current received by the comparator 17 is the same filtered output of the filtering circuit 13 that is received by comparator 15.

The comparator 17 has a higher threshold than the comparator 15, The comparator also has a slightly higher time constant than comparator 15. The comparator 17 can be considered to be an emergency comparator 17 that is triggered in response to a larger overcurrent event.

When the comparator 17 is triggered, a signal indicated as such is provided to the MCU 6. This may be provided over bus 30 or a different connection not shown in FIG. 1. In response to receipt of the signal, the MCU 6 reduces the frequencies of the fast and slow PLLs 14, 16 to bring them to the lowest gear in a set of possible gears stored by the MCU 6.

In some embodiments, other devices—in addition to or alternative to the comparators 15, 17—may provide a signal that causes the MCU 6 to reduce the clock frequency to the lowest gear. Such a signal may be provided, for example, by input current monitors (not shown in FIG. 1) for different components of the system, such as processing unit 2, or other components that are part of the same integrated circuit as the processing unit 2. If one of these input current monitors detects current above a threshold, it will issue a signal to the MCU 6 that causes the MCU 6 to reduce the frequencies of the fast and slow PLLs 14, 16 to the lowest possible gear.

A signal causing a shift to the lowest gear may be provided by a thermistor (not shown in FIG. 1) that is attached to or part of the processing unit 2. The thermistor will determine if the temperature of the processing unit 2 rises above a certain level (an overheat condition). In response to detecting such a condition, the thermistor issues a signal to the MCU 6 which causes the MCU 6 to reduce the frequencies of the fast and slow PLLs 14, 16 to the lowest possible gear.

In some embodiments, the maximum fast PLL 14 frequency AND minimum slow PLL 16 frequency in the lowest gear may be the same. In this case, both the fast PLL 14 and the slow PLL 16 are fixed at the same frequency (e.g. 200 MHz) when in the lowest gear. This provides a higher level of safety than having a lower gear in which the fast PLL 14 may be set to a higher frequency and risk exceeding the threshold. The process for switching to the lowest gear is similar to the process for switching to a lower gear shown in FIG. 10A, but with step (3) removed from the process, Specifically, the slow PLL 16 is selected initially and then the MCU 6 reduces the frequency of the fast PLL 14 to the frequency (e.g. 200 MHz) for the lowest gear. The MCU 6 then causes the fast PLL 14 to be selected and then reduces the frequency of the slow PLL 16 to the same frequency as the fast PLL 14 (e.g. 200 MHz). Either of the slow and fast PLL 14, 16 can then be selected when in this lowest gear, since they are both set to the same frequency.

Figure 13:
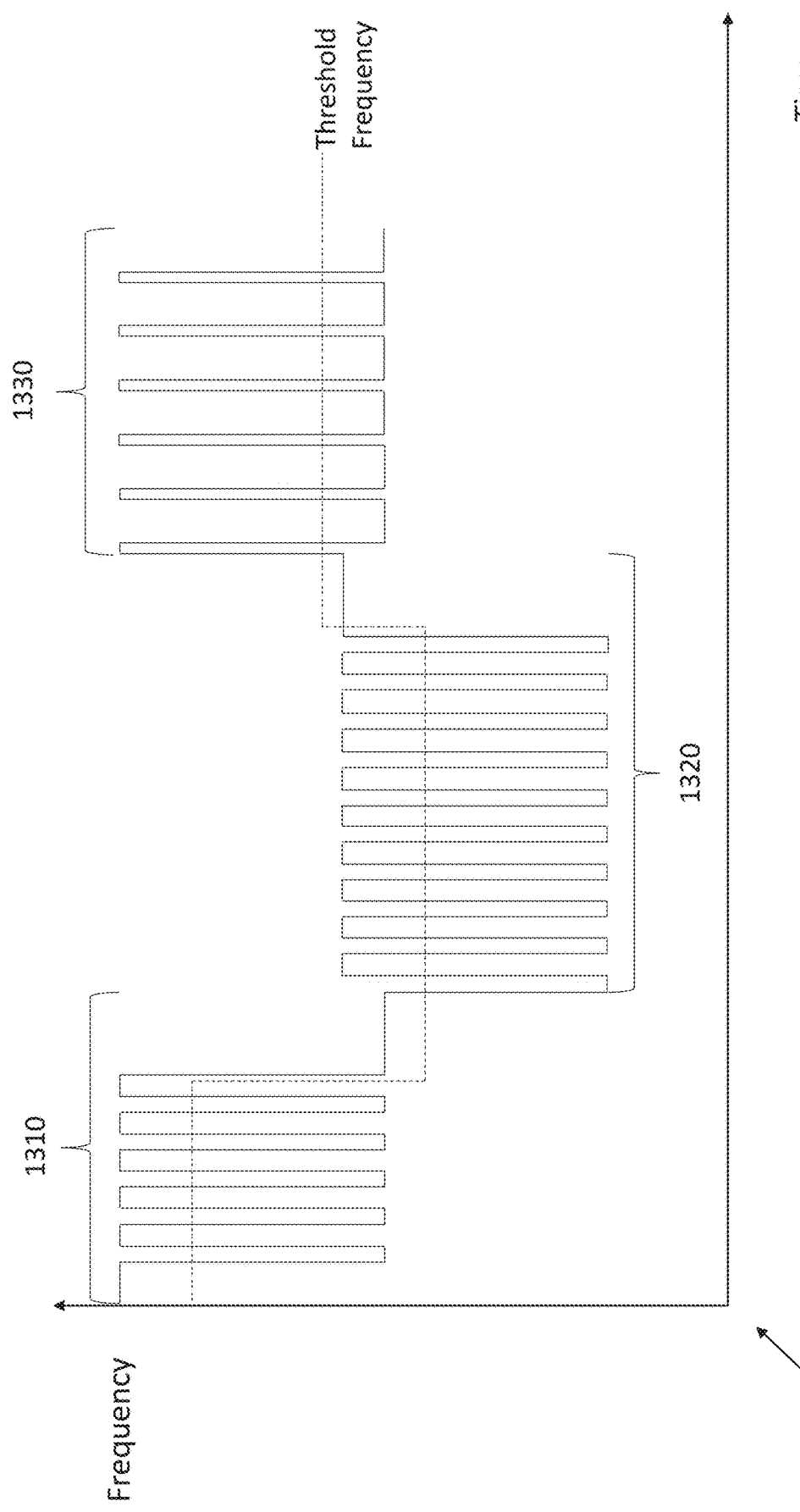
FIG. 13 illustrates an example showing how the frequencies of the clock signal supplied to the processor changes over time when the gearbox and dithering concepts are combined.

Above descriptions have been given of the first and second invention. In some embodiments, the first and second invention may be combined together. Reference is made to FIG. 13, which illustrates an example of the use of the combination of the dithering and gearbox techniques described.

FIG. 13, shows a dashed line and a solid line. The dashed line represents the threshold frequency, which varies as the application's behaviour varies. The solid line represents the frequency of the clock signal Φ. The output of the fast PLL 14 is at the maximum fast clock frequency for the current gear. The output of the slow PLL 16 is at the minimum slow clock frequency for the current gear. The graph 1300 is shown divided into three different time periods 1310, 1320, 1330, and illustrates how the PLLs 14, 16 are switched between gears in response to changes in the application's behaviour as illustrated by changes in the clock frequency.

During most of the first period 1310, the clock signal Φ switches between the output of the fast PLL 14 and the output of the slow PLL 16 to produce an appropriate average frequency for the clock signal Φ. As shown, after a certain period of time, in response to a change in the application's behaviour, the threshold frequency drops to a reduced level that is below the level of the slow PLL's frequency. As a result, the comparator 15 asserts its signal to indicate an overcurrent event, which is not removed by remaining on the slow PLL 16. The MCU 6 detects that the slow PLL 16 has been selected for greater than a predetermined amount of time and in response, determines to change from the currently selected gear to a lower gear. The MCU 6 carries out the gear change process described above.

In FIG. 13, once the gear change process has complete, the clock generation circuitry 12 varies between the output of the slow PLL 16 and the fast PLL 14 when providing the clock signal Φ. This is shown during the time period 1320. After a certain period of time, the threshold frequency increases above the frequency of the fast PLL 14 in the selected gear. As a result, the comparator 15 does not detect an overcurrent event and the fast PLL 14 remains selected. In response to determining that the fast PLL 14 has been selected for greater than a predetermined amount of time, the MCU 6 determines to increase the gear to a higher gear. The MCU 6 increases the gear in the manner as described above with respect to FIG. 10B. This higher gear selected during the period 1330 is the same as the gear selected in period 1310. However, as shown, since the threshold frequency is lower during most of period 1330, the proportion of time spent on the slow PLL 16 as compared to the fast PLL 14 is greater during period 1330 than in period 1310.

The power management techniques described above can be implemented to manage the power for a multi-tile processing unit 2. An example multi-tile processing unit 2 will now be described in more detail with reference to FIGS. 14 to 17.

Figure 14:
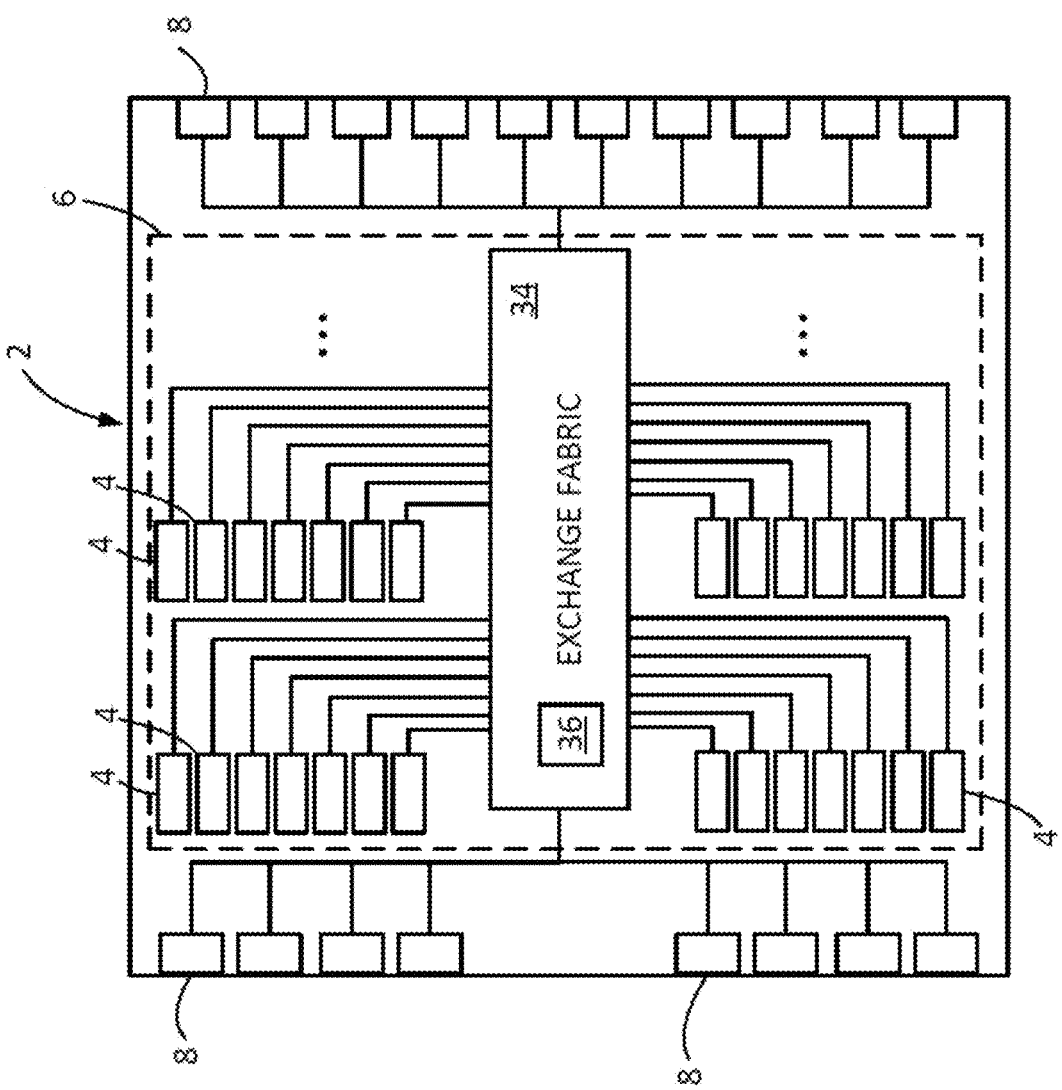
FIG. 14 is a schematic block diagram of a processor chip comprising multiple tiles.

Reference is made to FIG. 14, which illustrates an example of a multi-tile processing unit 2. The processing unit 2 comprises an array 46 of multiple processor tiles 3 and an interconnect 44 connecting between the tiles 3. The processing unit 2 may be implemented alone as one of multiple dies packaged in the same IC package. The interconnect 44 may also be referred to herein as the "exchange fabric" 44 as it enables the tiles 3 to exchange data with one another. Each tile 3 comprises a respective instance of a processor and memory. For instance, by way of illustration the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links 48, enabling the processing unit 2 to be connected to one or more other processing units (e.g. one or more other instances of the same processing unit 2). These external links 48 may comprise any one or more of: one or more processor-to-host links for connecting the processing unit 2 to a host processor, and/or one or more processor-to-processor links for connecting together with one or more other instances of the processing unit 2 on the same IC package or card, or on different cards. In one example arrangement, the processing unit 2 receives work from a host processor (not shown) which is connected to the processing unit via one of the processor-to-host links in the form of input data to be processed by the processing unit 2. Multiple instances of the processing unit 2 can be connected together into cards by processor-to-processor links. Thus a host accesses a computer, which is architected as a multi-tile system on a chip, depending on the workload required for the host application.

The interconnect 44 is configured to enable the different tiles 3 in the array 46 to communicate with one another. However, as well as there potentially being dependencies between threads on the same tile 3, there may also be dependencies between the portions of the program running on different tiles 3 in the array 46. A technique is, therefore, required to prevent a piece of code on one tile 3 running ahead of data upon which it is dependent being made available by another piece of code on another tile 4.

Each tile 3 is itself a processor capable of executing instructions (code) from a local instruction memory and handling data in local data memory. A tile 3 may comprise a respective instance of a barrel-threaded processor and a memory. For instance, by way of illustration the processing unit 2 may comprise of the order of hundreds of tiles 3, or even over a thousand. For completeness, note also that an "array" as referred to herein does not necessarily imply any particular number of dimensions or physical layout of the tiles 3.

Communication between tiles 3 on the processing unit 2 occurs in a time deterministic fashion. However, other forms of inter tile exchange are possible. There may be dependencies between the portions of the program running on different tiles 3 in the array 46. That is, processing data on one tile may depend on results from another tile, e.g. may provide results on which another tile depends. A technique is, therefore, required to prevent a piece of code on one tile 3 running ahead of data upon which it is dependent being made available by another piece of code on another tile 3.

Parallel programming models for AI and Data Science usually follows a 3-phase iterative execution model: Compute, Barrier, and Exchange. The implications are that data transfer to and from a processing unit is usually barrier dependent to provide data-consistency between the processing units and between each processing unit and a host. Typically used data consistency models are Bulk Synchronous Parallel (BSP), Stale Synchronous Parallel (SSP) and Asynchronous. Embodiments described herein use a BSP model, but it will be apparent that the other synch models could be utilised as an alternative.

Figure 16:
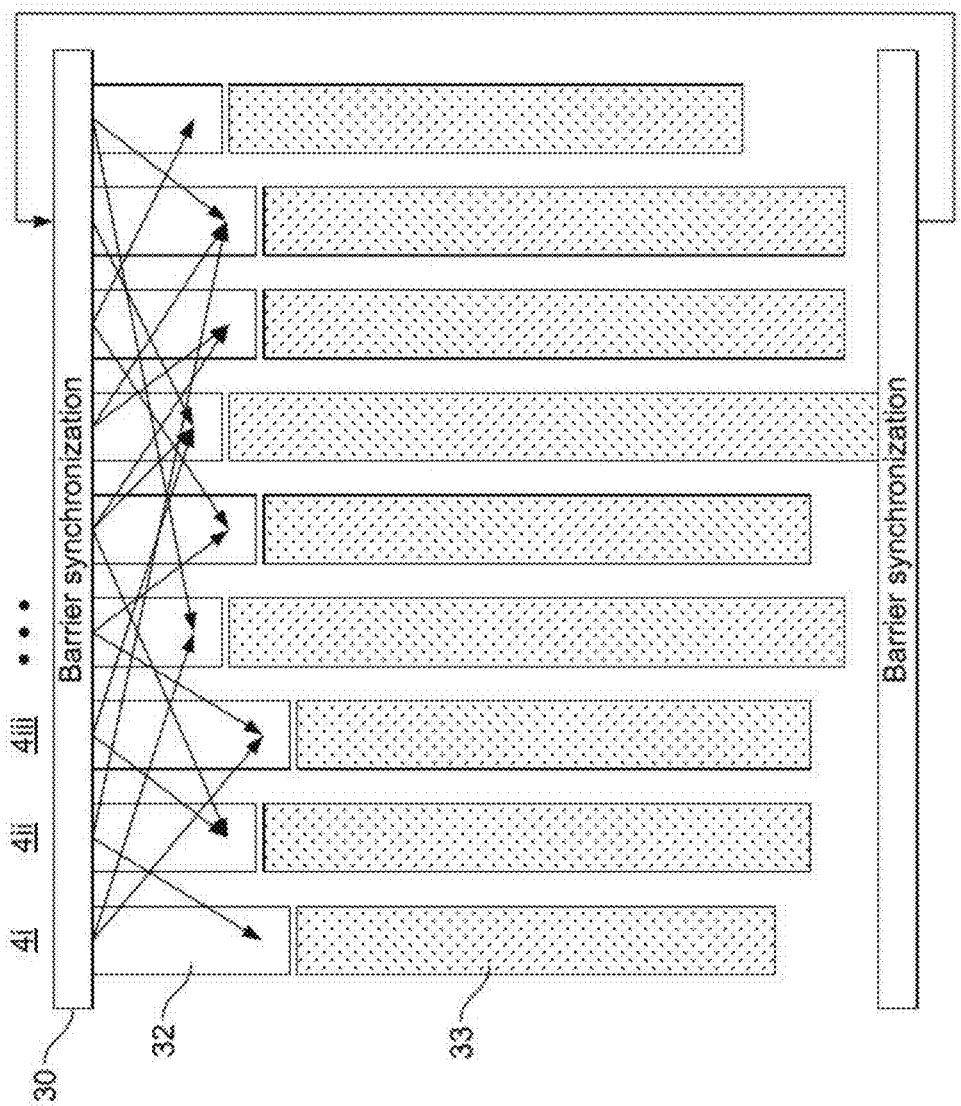
FIG. 16 is another schematic illustration of a BSP model.

Reference is made to FIGS. 15 and 16, which illustrate an implementation of a BSP exchange scheme in which each tile 3 performs a compute phase 43 and an exchange phase 42 in an alternating cycle, separated from one to the other by a barrier synchronization 40 between tiles. In the case illustrated by FIGS. 15 and 16, a barrier synchronization is placed between each compute phase 43 and the following exchange phase 42.

During the compute phase 43, each tile 3 performs one or more computation tasks locally on-tile, but does not communicate any results of these computations with any others of the tiles 3. In the exchange phase 42, each tile 3 is allowed to exchange one or more results of the computations from the preceding compute phase to and/or from one or more others of the tiles, but does not perform any new computations until it has received from other tiles 3 any data on which its task(s) has; have dependency. Neither does it send to any other tile, any data except that computed in the preceding compute phase. It is not excluded that other operations such as internal control-related operations may be performed in the exchange phase 42. The communication external to the tile group may optionally utilise the BSP mechanism, but alternatively may not utilize BSP and may instead use some other synchronization mechanism of its own.

According to the BSP principle, a barrier synchronization 40 is placed at the juncture transitioning from the compute phase 43 into the exchange phase 42, or the juncture transitioning from the exchange phase 42 into the compute phase 43, or both. That is to say, either: (a) all tiles 3 are required to complete their respective compute phases 43 before any in the group is allowed to proceed to the next exchange phase 42, or (b) all tiles 3 in the group are required to complete their respective exchange phases 42 before any tile in the group is allowed to proceed to the next compute phase 43, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 3 on the same processing unit 2 or different processing units could each form a separate respective BSP group operating asynchronously with respect to one another, with the BSP cycle of compute, synchronize and exchange being imposed only within each given group, but each group doing so independently of the other groups. I.e. a multi-tile array 46 might include multiple internally synchronous groups each operating independently and asynchronously to the other such groups (discussed in more detail later). In some embodiments there is a hierarchical grouping of sync and exchange, as will be discussed in more detail later.

FIG. 16 illustrates the BSP principle as implemented amongst a group 4i, 4ii, 4iii of some or all of the tiles in the array 46, in the case which imposes: (a) a barrier synchronization from compute phase 43 to exchange phase 42 (see above). Note that in this arrangement, some tiles 3 are allowed to begin computing 43 whilst some others are still exchanging.

Figure 17:
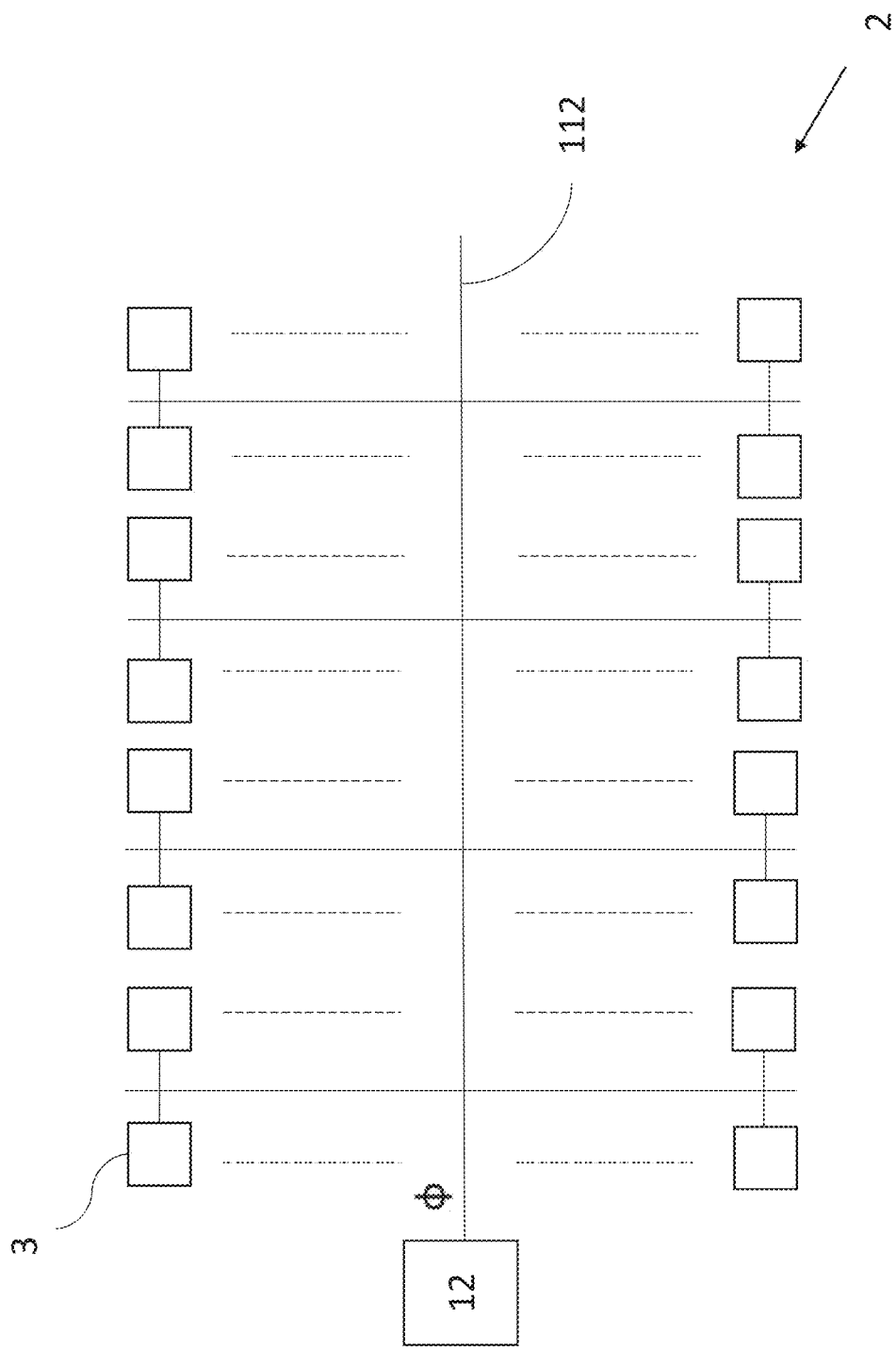
FIG. 17 is a schematic showing the distribution of clock signals to tiles along wires arranged in a clock tree structure.

FIG. 17 illustrate how the clock signal Φ may be distributed from the clock generator circuit 12 to the tiles 3 of the processing unit 2. The tiles 3, in the example, are shown arranged in columns. Each of the tiles 3 is connected to a copper wire 112, which provides the clock signal to each of the tiles 3. The copper wire 112 provides a clock tree for the processing unit 2. The copper wire 112 is selected to be between 0.2 micrometres and 2 micrometres in thickness. The copper wire 112 may, for example, be 1 micrometer thick and 0.5 micrometres wide. The high thickness of the copper wire 112 reduces the insertion delay of the clock signal, and allows the clock signal to propagate to each of the tiles 3 very rapidly.

Figure 18:
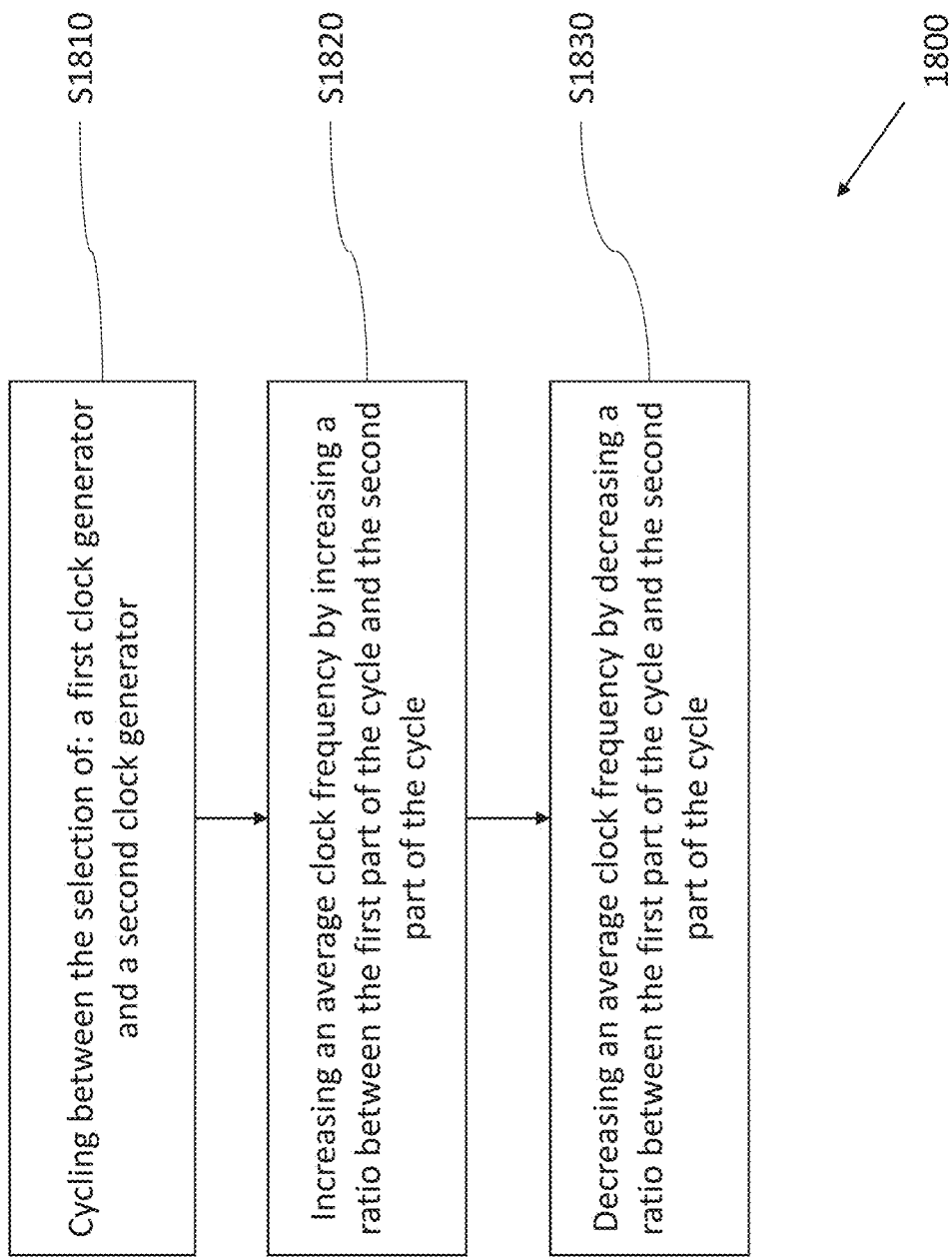
FIG. 18 is a method according to embodiments of a first invention.

Reference is made to FIG. 18, which illustrates a method 1800 according to embodiments of the first invention. It would be appreciated that although the steps of the method 1800 are shown in sequential order, there is some overlap in time between the steps. In particular, the step S1810 is performed throughout the duration of the method 1800, and overlaps with the steps S1820 and S1830.

At S1810, the switching circuitry cycles between the selection of the first clock generator for clocking the processing unit and the selection of the second clock generator for clocking the processing unit. The first clock generator is selected during a first part of the cycle, whilst the second clock generator is selected during a second part of the cycle. The frequency of the clock signal provided by the first clock generator is greater than the frequency of the clock signal provided by the second clock generator.

At S1820, the switching circuitry increases an average clock frequency for the processing unit by increasing a ratio between a duration of the first part of the cycle and a duration of the second part of the cycle.

At S1830, the switching circuitry increases the decreasing an average dock frequency for the processing unit by decreasing the ratio between the duration of the first part of the cycle and the duration of the second part of the cycle.

Figure 19:
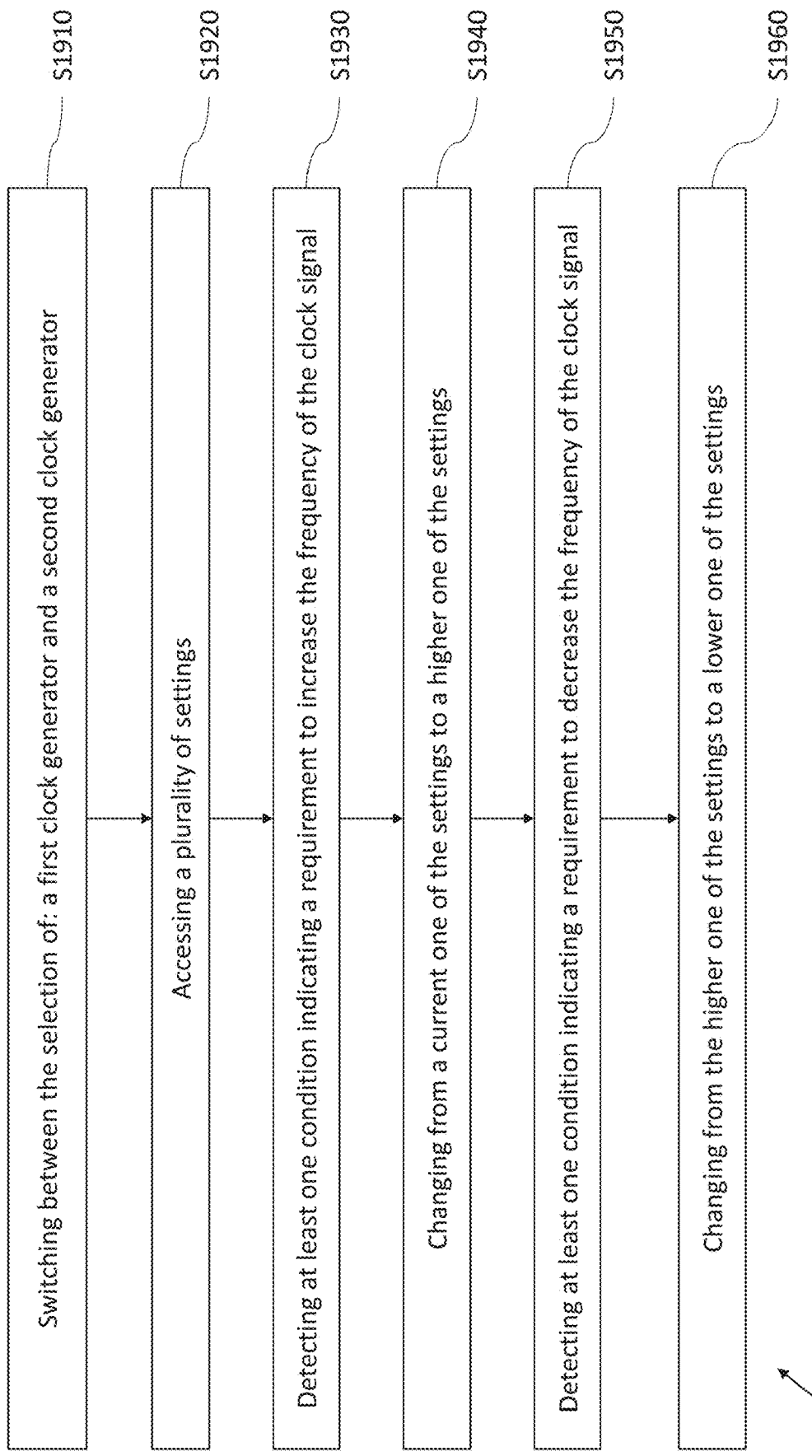
FIG. 19 is a method according to embodiments of a second invention.

Reference is made to FIG. 19, which illustrates a method 1900 according to embodiments of the second invention. It would be appreciated that the steps of method 1900 need not be performed in the order shown and that the performance of the steps may overlap in time. In particular, the steps S1910 and S1920 may be performed repeatedly at different points throughout the method 1900.

At S1910, switching circuitry is configured to switch between the selection of the first clock generator for providing the processor clock signal and the second clock generator for providing the processor clock signal.

At S1920, at least one processor accesses in memory of the system, a plurality of settings, wherein each setting comprises a maximum frequency for the first clock generator for that setting and a minimum frequency for the second clock generator for that setting.

At S1930, the at least one processor detects at least one condition indicating a requirement to increase the frequency of the clock signal.

At S1940, in response to S1930, the at least one processor causes a change from a currently selected setting to a higher one of the settings, wherein the higher one of the settings has a higher maximum frequency for the first clock generator and a higher minimum frequency for the second clock generator than the currently selected one of the settings.

At S1950, the at least one processor detects at least one condition indicating a requirement to decrease the frequency of the clock signal.

At S1960, the at least one processor causes a change from the higher one of the settings which was selected in S1940 to a lower one of the settings, wherein the higher one of the settings has a higher maximum frequency for the first dock generator and a higher minimum frequency for the second dock generator than the lower one of the settings.

It will be appreciated that the above embodiments have been described by way of example only.

The invention claimed is:

1. A method of controlling a frequency of a clock signal for a processing unit, the method comprising:
    cycling between selection of:
        a first clock generator for providing a processing unit clock signal for executing an application during a first part of a cycle; and
        a second clock generator for providing the processing unit clock signal for executing the application during a second part of the cycle, wherein a frequency of the processing unit clock signal provided by the second clock generator is less than a frequency of the processing unit clock signal provided by the first clock generator,
    increasing an average clock frequency for the processing unit by increasing a ratio between a duration of the first part of the cycle and a duration of the second part of the cycle;
    decreasing the average clock frequency for the processing unit by decreasing the ratio between the duration of the first part of the cycle and the duration of the second part of the cycle;
    determining whether power consumption of the processing unit exceeds a set power budget, including comparing a current threshold to a filtered version of a measurement of current drawn by the processing unit; and
    controlling the selection of the first clock generator and the selection of the second clock generator based on the comparing.

2. The method of claim 1, wherein the cycling comprises:
    selecting the second clock generator for providing the processing unit clock signal in response to a determination that the set power budget is exceeded; and
    selecting the first clock generator for providing the processing unit clock signal in response to a determination that the set power budget is not exceeded.

3. The method of claim 1, wherein comparing the current threshold to the filtered version of the measurement of current drawn by the processing unit is carried out using a comparator.

4. The method of claim 3, wherein the comparator has an associated delay, allowing the power consumption to exceed the power budget for a duration of time without triggering selection of the second clock generator.

5. The method of claim 1, comprising:
    changing from a first setting to a second setting, including adjusting frequencies set for the first clock generator and the second clock generator from frequencies defined by the first setting to frequencies defined by the second setting,
wherein the frequencies defined by the second setting are higher than the frequencies defined by the first setting, wherein the method further comprises:
performing the step of changing from the first setting to the second setting in response to a determination that the first clock generator has been selected for greater than a threshold amount of time.

6. The method of claim 1, comprising:
changing from a first setting to a second setting, including adjusting frequencies set for the first clock generator and the second clock generator from frequencies defined by the first setting to frequencies defined by the second setting,
wherein the frequencies defined by the first setting are higher than the frequencies defined by the second setting, wherein the method further comprises:
performing the step of changing from the first setting to the second setting in response to a determination that the second clock generator has been selected for greater than a threshold amount of time.

7. The method of claim 3, comprising:
in response to detection of an overcurrent event, changing from a first setting to a second setting, including adjusting frequencies set for the first clock generator and the second clock generator from frequencies defined by the first setting to frequencies defined by the second setting, wherein the second setting has lower values for the frequencies of the first and second clock generator than the first setting,
wherein the comparator for determining whether power consumption of the processing unit exceeds the set power budget is a first comparator, wherein the detection of the overcurrent event is performed by a second comparator having a higher current threshold than the first comparator.

8. The method of claim 1, comprising:
storing a plurality of settings, wherein each setting comprises a frequency for the first clock generator and a frequency for the second clock generator; and
changing from a first of the settings to a second of the settings, including adjusting the frequencies set for the first clock generator and the second clock generator from frequencies defined by the first of the settings to frequencies defined by the second of the settings.

9. The method of claim 8, comprising:
determining whether power consumption of the processing unit exceeds the set power budget, including comparing the current threshold to the filtered version of the measurement of current drawn by the processing unit using a comparator;
controlling the selection of the first clock generator and the selection of the second clock generator using an output signal of the comparator; and
performing the changing from the first of the settings to the second of the settings in dependence upon the output signal of the comparator.

10. The method of claim 8, further comprising:
in response to detection of an overcurrent event, changing to a third of the settings by adjusting the frequencies set for the first clock generator and the second clock generator to frequencies defined by the third of the settings, wherein the third of the settings has lower values for the frequencies of the first and second clock generator than any others of the settings.

11. The method of claim 1, wherein the processing unit comprises multiple processors, the method further comprising distributing the processing unit clock signal along wires of a clock tree of the processing unit to each of the multiple processors.

12. The method of claim 11, wherein the wires are copper wires having a thickness greater than 0.2 micrometres.

13. A system for providing a processing unit clock signal to a processing unit, the system comprising:
a first clock generator configured to provide the processing unit clock signal for executing an application during a first part of a cycle;
a second clock generator configured to provide the processing unit clock signal for executing the application during a second part of the cycle, wherein a frequency of the processing unit clock signal provided by the second clock generator is less than a frequency of the processing unit clock signal provided by the first clock generator; and
switching circuitry configured to:
switch between selecting the first clock generator for clocking the processing unit during the first part of the cycle and the second clock generator for clocking the processing unit during the second part of the cycle; and
increase an average clock frequency for the processing unit by increasing a ratio between a duration of the first part of the cycle and a duration of the second part of the cycle, wherein the switching circuitry comprises a multiplexor, the system further comprising:
an OR gate configured to control the multiplexor, the OR gate receiving as inputs a clock select signal and a signal from a register that stores a value written by a control unit, wherein the control unit is configured to write the value to the register in response to determining that one of the first clock generator and the second clock generator has been selected by more than a threshold amount of time.

14. The system of claim 13, wherein the switching circuitry is further configured to:
decrease the average clock frequency for the processing unit by decreasing the ratio.

15. The system of claim 13, further comprising a power management integrated circuit (PMIC) configured to output an alert comprising the clock select signal.

16. A method comprising:
executing an application by a processing unit, the processing unit receiving a processing unit clock signal;
performing a plurality of cycles of the processing unit clock signal, and within each cycle controlling a multiplexor to switch between: a first clock generator in a first cycle part and a second clock generator in a second cycle part, wherein a frequency of the second clock generator is less than a frequency of the first clock generator;
increasing an average value of the processing unit clock signal, including increasing a ratio between a duration of the first cycle part and a duration of the second cycle part;
decreasing the average value of the processing unit clock signal, including decreasing the ratio between the duration of the first cycle part and the duration of the second cycle part;

determining whether power consumption of the processing unit exceeds a set power budget, including comparing a current threshold to a filtered version of a measurement of current drawn by the processing unit; and performing the plurality of cycles by controlling a selection of the first clock generator and the selection of the second clock generator based on the comparing.

17. The method of claim 16, wherein performing the plurality of cycles comprises:

selecting the second clock generator for providing the processing unit clock signal in response to a determination that the set power budget is exceeded.

18. The method of claim 16, wherein performing the plurality of cycles comprises:

selecting the first clock generator for providing the processing unit clock signal in response to a determination that the set power budget is not exceeded.

19. The method of claim 16, wherein comparing the current threshold to the filtered version of the measurement of current drawn by the processing unit is carried out using a comparator.

20. The method of claim 16, comprising:

changing from a first setting to a second setting, including adjusting frequencies set for the first clock generator and the second clock generator from frequencies defined by the first setting to frequencies defined by the second setting, wherein the frequencies defined by the second setting are higher than the frequencies defined by the first setting, wherein the method comprises:

performing the changing from the first setting to the second setting in response to a determination that the first clock generator has been selected for greater than a threshold amount of time.

21. The method of claim 20, further comprising:

in response to detection of an overcurrent event, changing to a third setting by adjusting the frequencies set for the first clock generator and the second clock generator to frequencies defined by the third setting, wherein the third setting has lower values for the frequencies of the first and second clock generator than the first setting or the second setting.

* * * * *